United States Patent
Bazalgette et al.

(10) Patent No.: US 12,238,140 B2
(45) Date of Patent: Feb. 25, 2025

(54) ARTIFICIAL INTELLIGENCE BASED ANALYST AS AN EVALUATOR

(71) Applicant: Darktrace Holdings Limited, Cambridge (GB)

(72) Inventors: Timothy Owen Bazalgette, Knebworth (GB); Constance Alice Chapman, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 111 days.

(21) Appl. No.: 17/571,381

(22) Filed: Jan. 7, 2022

(65) Prior Publication Data

US 2022/0224724 A1  Jul. 14, 2022

Related U.S. Application Data

(60) Provisional application No. 63/274,376, filed on Nov. 1, 2021, provisional application No. 63/135,394, filed on Jan. 8, 2021.

(51) Int. Cl.
*H04L 29/06* (2006.01)
*H04L 9/40* (2022.01)

(52) U.S. Cl.
CPC ................................ *H04L 63/20* (2013.01)

(58) Field of Classification Search
CPC ....... H04L 63/20; H04L 63/10; H04L 63/145; H04L 63/126; H04L 63/0263; H04L 63/107

(Continued)

(56) References Cited

U.S. PATENT DOCUMENTS 6,154,844 A  11/2000  Touboul et al.
6,965,968 B1  11/2005  Touboul
(Continued)

FOREIGN PATENT DOCUMENTS

EP  2922268 A1  9/2015
WO  2001031420 A2  5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Longbit Chai
(74) *Attorney, Agent, or Firm* — Rutan and Tucker, LLP

(57) ABSTRACT

Methods, systems, and apparatus are disclosed for an Artificial Intelligence based cyber security system. An Artificial Intelligence based cyber analyst can make use of a data structure containing multiple tags to assist in creating a consistent, expanding modeling of an ongoing cyber incident. The Artificial Intelligence based cyber analyst can make use of a cyber incident graph database when rendering that incident to an end user. The Artificial Intelligence based cyber analyst can also be used as a mechanism to evaluate the quality of the alerts coming from 3rd parties' security tools both when the system being protected by the cyber security appliance is not actually under attack by a cyber threat as well as during an attack by a cyber threat.

20 Claims, 15 Drawing Sheets

(58) Field of Classification Search
USPC .......................................................... 726/23
See application file for complete search history.

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 7,843,322 B2 | 11/2010 | Zakrewski et al. |
| 7,890,869 B1 | 2/2011 | Mayer et al. |
| 8,312,540 B1 | 11/2012 | Kahn et al. |
| 8,661,538 B2 | 2/2014 | Cohen-Ganor et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,348,742 B1 | 5/2016 | Brezinski |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,237,298 B1 | 3/2019 | Nguyen et al. |
| 10,268,821 B2 | 4/2019 | Stockdale |
| 10,419,466 B2 | 9/2019 | Ferguson |
| 10,516,693 B2 | 12/2019 | Stockdale et al. |
| 10,701,093 B2 | 6/2020 | Dean |
| 2002/0174217 A1 | 11/2002 | Anderson et al. |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0077358 A1 | 3/2008 | Marvasti |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0107254 A1 | 4/2010 | Elland et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2017/0054745 A1 | 2/2017 | Zhang et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2019/0036948 A1 | 1/2019 | Appel et al. |
| 2019/0044963 A1 | 2/2019 | Rajasekharan et al. |
| 2019/0251260 A1 | 8/2019 | Stockdale et al. |
| 2019/0342307 A1* | 11/2019 | Gamble ............... G06F 16/9024 |
| 2020/0021607 A1 | 1/2020 | Muddu et al. |
| 2020/0244673 A1 | 7/2020 | Stockdale |
| 2020/0280575 A1 | 9/2020 | Dean et al. |
| 2020/0296124 A1 | 9/2020 | Pratt et al. |
| 2021/0273958 A1 | 2/2021 | McLean |
| 2021/0120027 A1 | 4/2021 | Dean et al. |
| 2021/0157919 A1 | 5/2021 | Stockdale et al. |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.
International Search Report and Written Opinion, PCT/US2022/011713, ISA:US, Apr. 8, 2022, 12 pp.
European Patent Office, European Search Report, 11 pages, May 7, 2024.

* cited by examiner

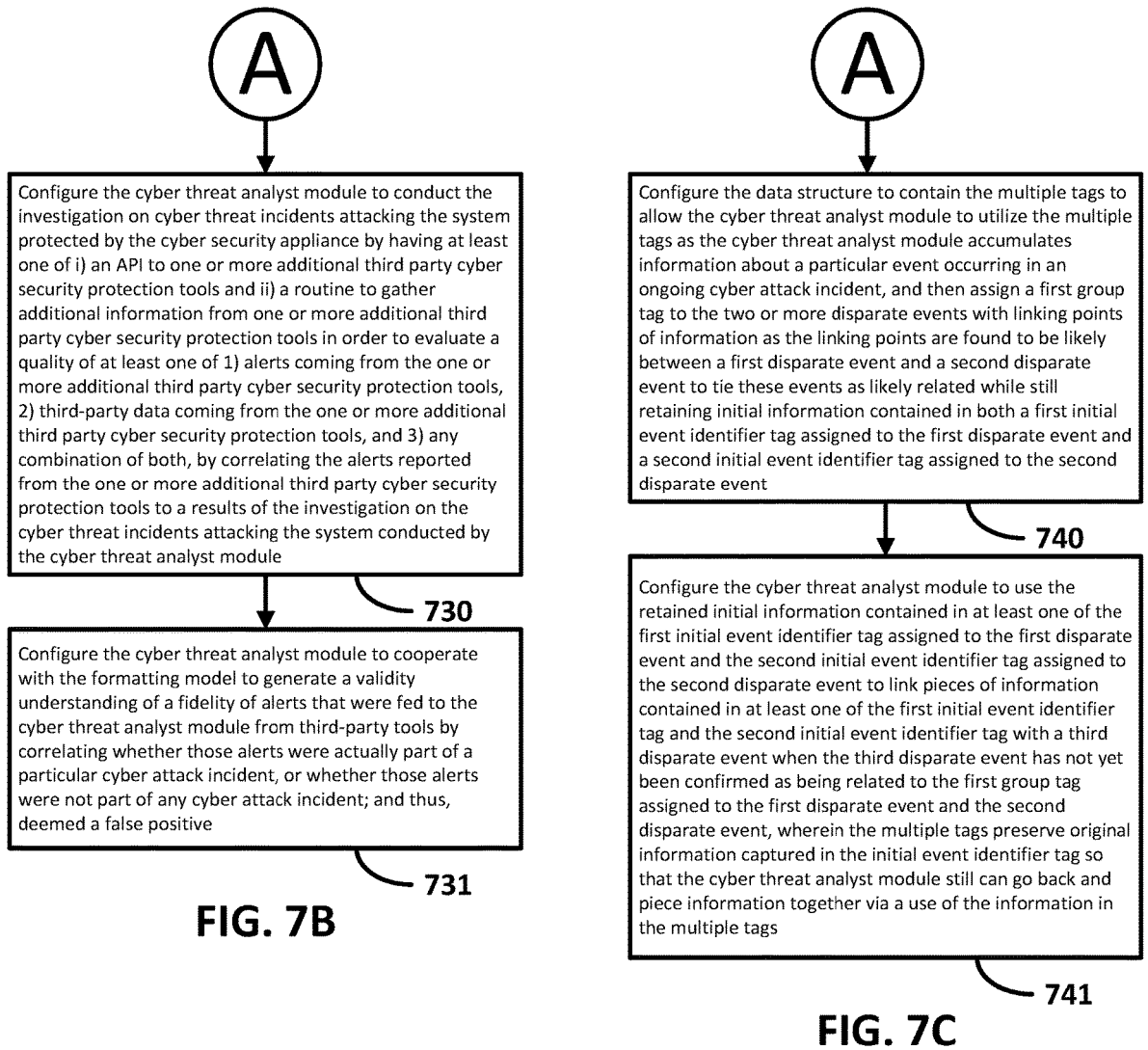

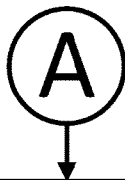

Configure a tag assigning module in the cyber threat analyst module to cooperate with the data structure to i) uniquely identify the initial event identifier tags, and ii) assign the group tags in a consistent and cumulative manner, as well as have a structure to contain an analysis from machine learning on potential relationships of information in light of each other and how the relationships of information relate to potential cyber threats that could be attacking the system

Configure the formatting model to 1) apply a plurality of different colors to convey commonality and differences of between a plurality of generated visual representations in the graphical report corresponding to the two or more disparate events with linking points of information to assist in an understanding of the graphical report as well as 2) present the visual representations positionally within a network in relation to other devices involved in the cyber threat attack and/or geographically in relation to other devices involved in the cyber threat attack

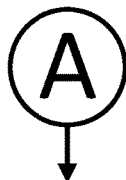

Configure the cyber threat analyst module to investigate the cyber threat incidents by cooperation with one or more of the group consisting of: one or more artificial intelligence models trained on how human cyber security analysts conduct an investigation on a possible set of cyber threats hypotheses, one or more scripts outlining how to conduct an investigation on a possible set of cyber threats hypotheses, and one or more rules based models on how to conduct an investigation on a possible set of cyber threats hypotheses

ARTIFICIAL INTELLIGENCE BASED ANALYST AS AN EVALUATOR

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATIONS

This application claims priority under 35 USC 119 to U.S. provisional patent application Ser. 63/135,394, titled "A CYBER SECURITY SYSTEM" filed Jan. 8, 2021, which the disclosures of such are incorporated herein by reference in their entirety. This application also claims priority under 35 USC 119 to U.S. provisional patent application Ser. 63/274,376 titled "SECURITY TOOLS" filed Nov. 1, 2021, which the disclosures of such are incorporated herein by reference in their entirety.

FIELD

Cyber security and, in an embodiment, use of Artificial Intelligence in cyber security.

BACKGROUND

There is something of an arms race between criminals and hackers on one side and cyber-security professionals on the other. Attacks are becoming more sophisticated and often happen very quickly in time. Having defensive tools that are fast-acting, providing needed information to the cyber-security professionals on duty, and presenting this information in a timely manner that is easily understood by both the professionals and their management team is highly desirable.

SUMMARY

Methods, systems, and apparatus are disclosed for an Artificial Intelligence based cyber security system. An Artificial Intelligence based cyber analyst can make use of a data structure containing multiple tags to assist in creating a consistent, expanding modeling of an ongoing cyber incident. The Artificial Intelligence based cyber analyst can make use of a cyber incident graph database when rendering that incident to an end-user. The Artificial Intelligence based cyber analyst can also be used as a mechanism to evaluate the quality of the alerts coming from 3rd parties' security tools both when the system being protected by the cyber security appliance is not actually under attack by a cyber threat as well as during an attack by a cyber threat.

These and other features of the design provided herein can be better understood with reference to the drawings, description, and claims, all of which form the disclosure of this patent application.

DRAWINGS

The drawings refer to some embodiments of the design provided herein in which:

FIG. 7B illustrates a second portion of the process of operating an artificial intelligence based cyber-security appliance in accordance with an embodiment of the disclosure.

FIG. 7C illustrates a third portion of the process of operating an artificial intelligence based cyber-security appliance in accordance with an embodiment of the disclosure.

FIG. 7D illustrates a fourth portion of the process of operating an artificial intelligence based cyber-security appliance in accordance with an embodiment of the disclosure.

FIG. 7E illustrates a fifth portion of the process of operating an artificial intelligence based cyber-security appliance in accordance with an embodiment of the disclosure.

FIG. 7F illustrates a sixth portion of the process of operating an artificial intelligence based cyber-security appliance in accordance with an embodiment of the disclosure.

Figure 1:
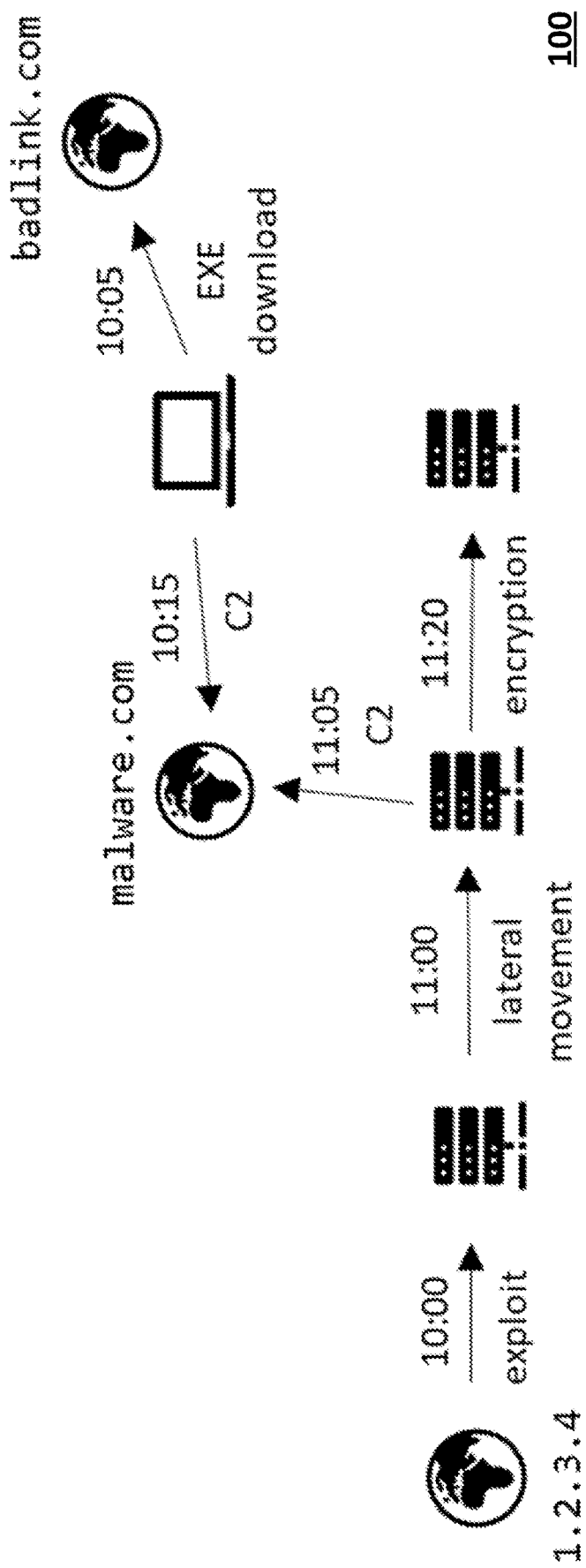
FIG. 1 illustrates a block diagram of a portion of an exemplary system protected by an Artificial Intelligence based cyber-security appliance in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations, which, when joined logically together, comprise the function and achieve the stated purpose for the function.

Indeed, a function of executable code may include a single instruction or many instructions and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

In general, an Artificial Intelligence based Cyber Security Appliance (CSA) is disclosed. A Cyber Threat Analyst Module (CTAM) can use Artificial Intelligence to investigate cyber threat incidents. The CTAM can also use a data structure constructed to contain multiple tags to assist in modeling of an expansion of an amount of events subsumed into an ongoing Cyber Threat Attack Incident (CTAI), during the ongoing cyber threat attack incident, to reflect a lifecycle of the ongoing cyber threat attack incident.

The data structure may be a persistent graph-based structure which may comprise graphs, nodes, edges, and tags. In general, a graph may be the highest-level structure and may comprise one or more nodes and/or one or more subgraphs. Some graphs may contain multiple subgraphs. Subgraphs are portions of a graph that have not yet been coupled to other portions of the graph. Nodes may comprise, for example, devices, usernames, endpoints, IP addresses, files, and the like. Edges may be directed and may be used to couple one node to another. Tags may contain metadata attached to graphs, subgraphs, nodes, and/or edges to provide information that may be useful in understanding a CTAI during its lifecycle.

One of the tags in a subgraph may be a group tag. A unique group tag may be assigned to a node when it first appears in the graph, if it is not coupled to any other node. Subsequently, that first node may be coupled to another node new node, and the second new node may also be assigned the group tag of the first new node. If nodes in two different groups are linked by an edge, the CTAM may treat the new combined subgroup as if it were a single subgroup having the unique group tag of the earliest of the coupled subgroups. This may allow disparate events to be identified by the earliest group tag.

The modelling of events in a persistent graph-based structure may allow for the creation of incidents which fully reflect the complex lifecycle of a compromise or cyber incident. Disparate events can become attached to the incident as linking points are found, allowing the full scale to be mapped.

The cyber threat analyst module can cooperate with a formatting module to generate both i) alerts on the disparate events as they happen and ii) a visual indication of the scale of the ongoing cyber threat attack incident as mapped by the two or more disparate events with linked information indicated by the same group tag while the ongoing cyber threat attack incident is still happening. The data structure also lends itself to a human-friendly rendering and can be visually represented and interacted with in a way that allows cyber professionals to quickly understand the scenario and allows them to report on that scenario to non-professionals. The visual indication on the user interface created by the formatting module creates an automated output that can be used to quickly get abreast of the scenario because of the high-level pertinent information presented initially on the user interface rather than something heavily technical which can be used as a model. The heavily technical details can be called up when a user interacts with a node on the visual indication, but the initial presentation tries to convey an overview of the linking of a cyber attack in order for a person to quickly get a high-level understanding of the overall cyber attack and then allow the user to delve down into the heavy technical details as they choose.

Finally, the cyber threat analyst module can use Artificial Intelligence to investigate cyber threat incidents. In combination with the data structure and visual indication, this allows the artificial intelligence to make additional assessments. The full understanding allows the artificial intelligence of the cyber security appliance to report upon the fidelity of alerts that were fed to it from third-party cyber security tools. For example, the artificial intelligence of the cyber security appliance—did those alerts trigger the creation of incidents that were indeed an indicator of a cyber attack, or where the alerts from the third-party cyber security tools deemed false positives because those alerts were never tied to any actual cyber attack? A generated report, including the report with the visual indication of the ongoing cyber attack, can also contain a section reporting on the fidelity of alerts that were fed to the cyber security appliance from third-party cyber security tools.

An artificial intelligence based cyber-security appliance (CSA) may comprise a number of modules or functions. These modules may be implemented in software, hardware, or a combination thereof. The CSA may comprise a Data Store which may hold a data structure of records of detected cyber threat attack incidents (CTAI).

These records may be persistent and comprise record type (graph, subgraph, node, or edge) and tags for metadata that may be used to analyze a CTAI. The sort of tags may include an initial event identifier tag, a type-of-event tag, a device tag, a geographical location tag, a timestamp tag, an event details tag, and an event analysis tag. All data entered into a graph may be persistent and nothing is ever overwritten. This allows subsequent analysis to determine connections that were originally overlooked.

The CSA may comprise a Trigger Module that may detect unusual (and thus suspect) activity anywhere in the system being protected. The information may be forwarded to the Cyber-Threat Analysis Module (CTAM), which may, in turn, open a persistent record in the Data Store and add the appropriate information and tags.

The CTAM may cooperate with an Analyzer Module (AM) that may reference any of a number of online Artificial Intelligence (AI) and/or rules-based models to analyze any events and/or groups of events in the Data Store. The sorts of models used by the AM and the CTAM may be, but are not limited to, a machine learning model on how to conduct investigations, a machine learning model of potential cyber threats, a machine learning model of the normal pattern of activity in the protected system, a number of machine learning models of normal activity in various subsystems in the protected system, and a rules-based model on how to conduct cyber investigations. The CTAM may also have a tag assigning module that may be responsible for generating and maintaining the persistent records and their various tags.

The CTAM may also cooperate with a User Interface/Formatting Module (UIFM). The subgraphs, nodes, edges, and tag and their persistent nature in the Data Store may lend themselves to graphical representation around nexuses of related events and groups to create a graphical representation of a cyber attack in real time as a CTAI progresses that can be easily understood by cyber-security professionals and their managers.

The UIFM also may cooperate with the data store to generate the visual indication outputted as a graphical representation that shows a timeline of the two or more disparate events with linked information deemed by the cyber threat analyst module to be relevant to the ongoing cyber threat attack incident, and device locations of where the two or more disparate events with linked information occurred.

The UIFM may also have a user interface configured to allow a user to assemble and generate a graphical report on that ongoing cyber threat attack incident. The report may (at least) graphically show the timeline, the two or more disparate events with linking points of information, and the device locations where the two or more disparate events with linking points of information occurred. The generated visual representations of nodes in the graphical report can be interacted with to pull up additional details on that node.

The UIFM may be configured to apply a plurality of different colors to convey commonality and differences between a plurality of generated visual representations in the graphical report. The UIFM may be further configured to present the visual representations positionally within a network in relation to other devices involved in the cyber threat attack and/or geographically in relation to other devices involved in the cyber threat attack. The use of colors and visual representations may facilitate understanding of the CTAI for professionals and non-professionals. The reports may be organized around nodes for conciseness and neatness, and less information is initially displayed. Further details of information may be pulled up and displayed as needed.

The CTAM may be further configured to actively investigate CTAIs in cooperation with various other modules and resources. These resources may be one or more artificial intelligence models trained on how human cyber security analysts conduct an investigation on a possible set of cyber threats hypotheses, one or more scripts outlining how to conduct an investigation on a possible set of cyber threats hypotheses, and/or one or more rules-based models on how to conduct an investigation on a possible set of cyber threats hypotheses, and the like.

The CTAM may be further configured to actively investigate by having an API to one or more additional third-party cyber security protection tools and/or a routine to gather additional information from one or more additional third-party cyber security protection tools. The CTAM may evaluate alerts coming from one or more additional third-party cyber security protection tools and/or third-party data coming from one or more additional third-party cyber security protection tools. The CTAM may correlate data from the third-party cyber security protection tools with data from elsewhere in the CAS to evaluate the quality of those tools.

The data structure may be, for example, a persistent graph-based structure, or the like, and may be constructed to contain the multiple tags and metatags to assist in modeling an expansion of an amount of events subsumed into an ongoing cyber threat attack incident during the ongoing cyber threat attack incident and to reflect a lifecycle of the ongoing cyber threat attack incident. The data structure can uses nodes such as devices, usernames, endpoints, IPs, and files, with directed edges linking these containing metadata such as timestamps. These structures are then associated with any additional event id and/or group id nodes to allow for consistent id assignment.

The data structure can be configured to connect two or more nodes determined to be related by the cyber threat analyst module via one or more of the following mechanisms 1) by adding a group tag that indicates that the nodes are related, 2) by performing a calculation of relatedness and using at least one of a software pointer and other tracking mechanism that indicates that the nodes are related.

Note, the graphic in FIG. 1 may be typical of the sort of display the UIFM initially produces in black and white. In many embodiments, it may be color-coded to improve understanding of the visual display or animated to show progression over time.

Many more details of the operation of the CSA are to be found by referring to FIGS. 9-13 and their accompanying descriptions. Examples of the CSA in operation during a CTAI are found in FIGS. 1-8 and their accompanying descriptions below.

Referring to FIG. 1, a block diagram of a portion of an exemplary system protected by an Artificial Intelligence based cyber-security appliance in accordance with an embodiment of the disclosure is shown. The figure is a graph that may show a CTAI involving a portion of a system 100 with four nodes (a laptop device and three server devices) that may be affected by a cyber-attack incident as described with respect to FIGS. 2-6.

The arrows with time stamps may be edges and may indicate suspicious (and ultimately malicious) events relevant to the cyber-attack incident. The physical devices may all be coupled to each other (not shown) and the cyber-security appliance (not shown) to avoid overcomplicating the disclosure. All the devices in the system may be located at the same site, at different sites, may be coupled directly via cabling or indirectly by wireless networks, or may be coupled together by the Internet or some other means. The text shown in the figure is metadata relevant to the CTAI. It may include timestamps and descriptions associated with each edge and IP addresses and/or website names. The internal nodes may also be named (not shown in the figure). initial event identifier tags The graphic in FIG. 1 may be typical of the sort of display the UIFM initially produces in black and white. In many embodiments, it may be color-coded to improve understanding of the visual display or animated to show progression over time. Any of the seven nodes displayed (four internal and three external) and/or the six edges may be selected to look up all additional information available for that node and/or edge.

Figure 2:
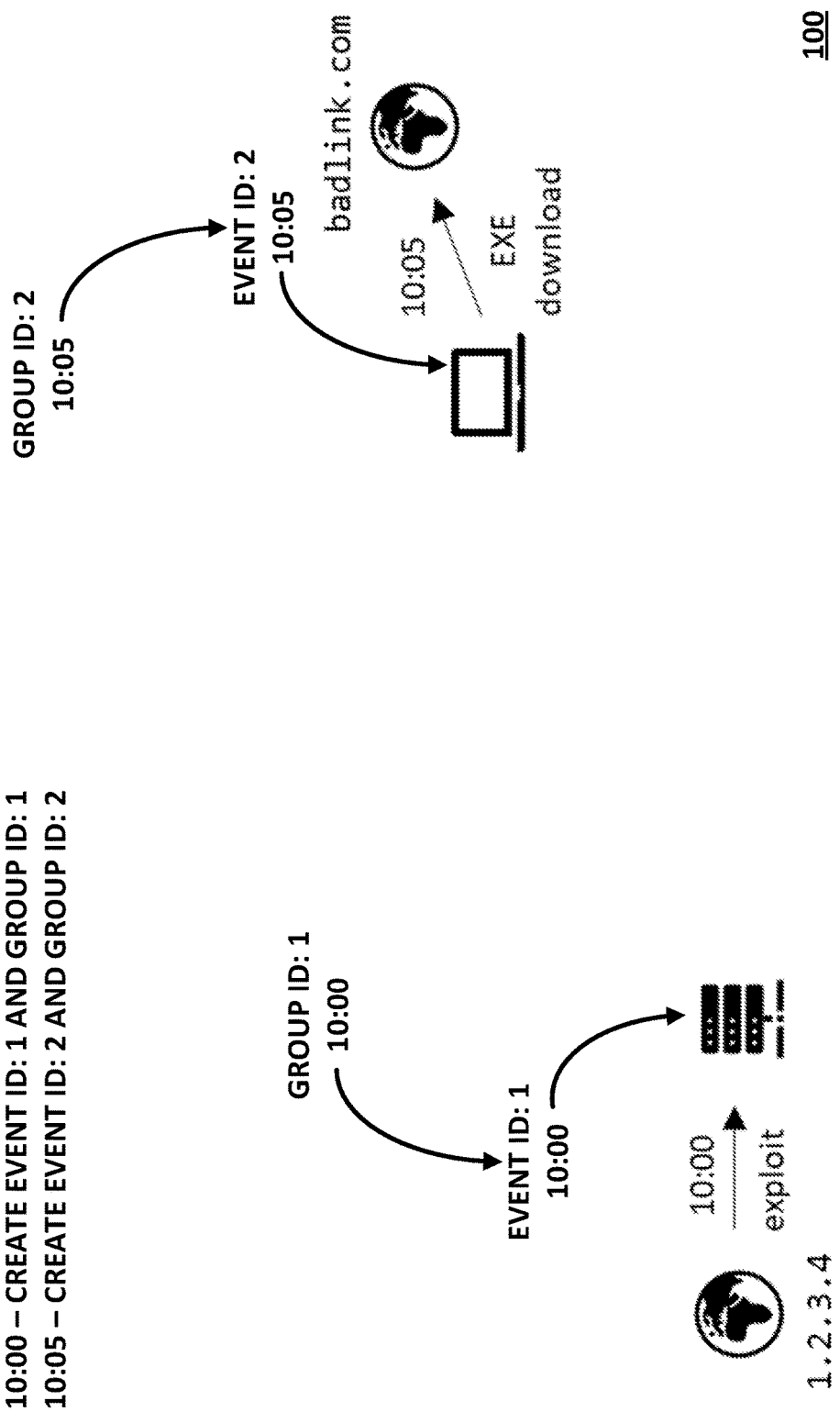
FIG. 2 illustrates a block diagram of the reaction of the cyber-security appliance to the first and second events of a cyber-attack incident on the exemplary system of FIG. 1 in accordance with an embodiment of the disclosure.

Referring to FIG. 2, a block diagram of the reaction of the cyber-security appliance to the first and second events of a cyber-attack incident on the exemplary system of FIG. 1 in accordance with an embodiment of the disclosure is shown. FIG. 2 may be presented from the perspective of the cyber-security appliance (not shown). Thus, to start, only a portion of the final display may be available in the graphic representation of the CTAI. Two as yet unlinked subgraphs of affected portions of system 100 (a single server and the laptop) may be shown. Also present in FIG. 2 are two external nodes and the edges connecting them to the internal nodes that may be related to a CTAI.

At time 10:00, an exploit from an Internet address node (exemplarily labeled "1.2.3.4" but could be any IP address) involving an internal server node may be detected. As it is as yet unrelated to anything, the internal server node may be given an initial event identifier tag EVENT ID: 1 may also become the first event of a newly created GROUP ID: 1 and may be stored as a new record in a data store in the CSA.

At time 10:05, a second event (the downloading of an executable file from the website "badlink.com") involving the laptop may occur. Since every event may be given an initial event identifier tags and EVENT ID:1 is already in use, a new record may be opened and tagged as EVENT ID: 2 and associated with the internal laptop node. Since there is no reason to associate this with another event or group, the node may be tagged as GROUP ID: 2 (since presently GROUP ID: 1 is in use with a different group).

Figure 3:
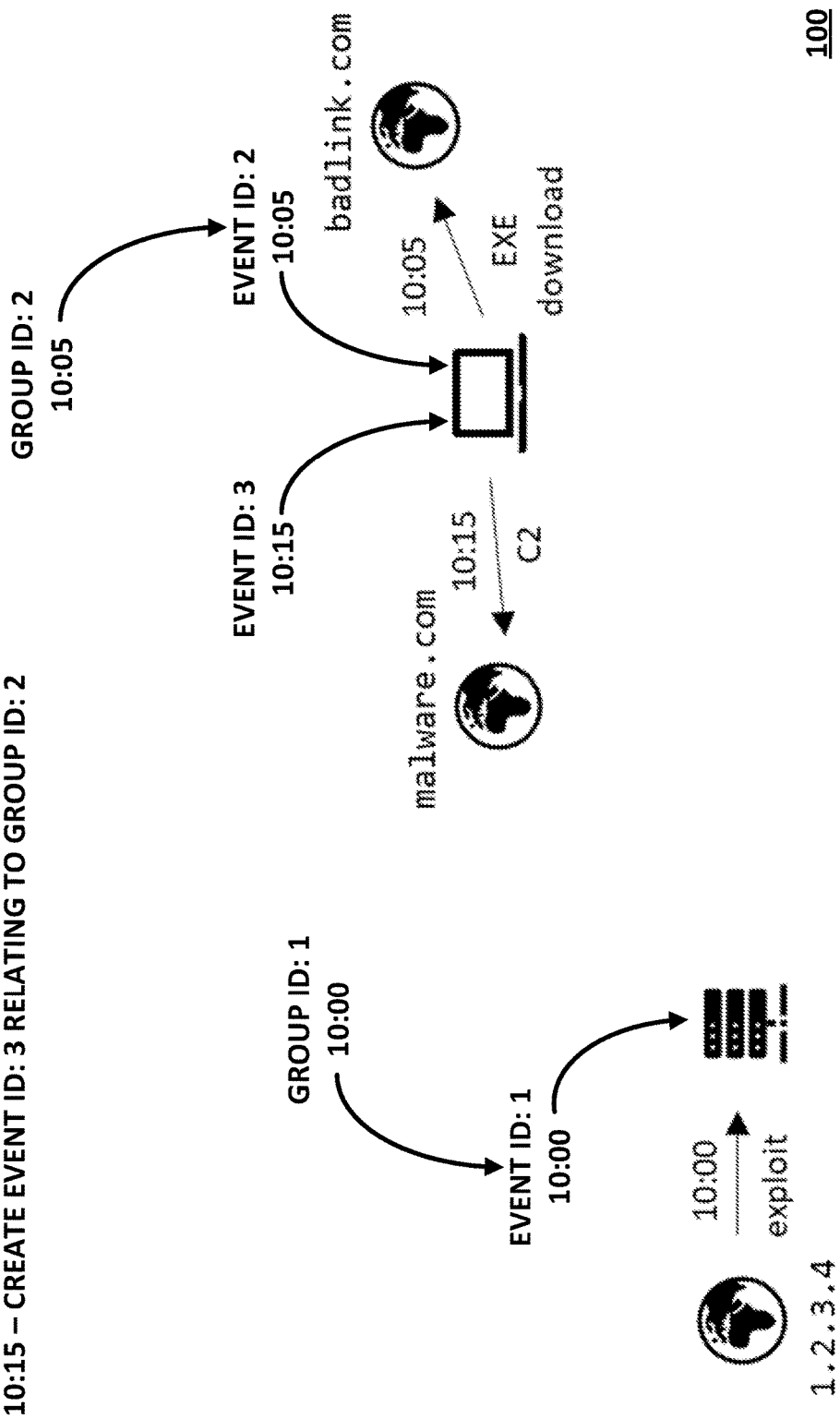
FIG. 3 illustrates a block diagram of the reaction of the cyber-security appliance to the third event of the cyber-attack incident on the exemplary system of FIG. 1 in accordance with an embodiment of the disclosure.

Referring to FIG. 3, a block diagram of the reaction of the cyber-security appliance to the third event of the cyber-attack incident on the exemplary system of FIG. 1 in accordance with an embodiment of the disclosure is shown. At time 10:15, a third event may be detected—a command and control (C2) access to the website "malware.com." This originated on the same device as EVENT ID: 2, so it may be tagged EVENT ID: 3 and GROUP ID: 2 as it is related to the same system (the internal laptop) where EVENT ID: 2 occurred. At this time, there may still be no reason for the CSA to know if there is an association between the groups GROUP ID: 1 and GROUP ID: 2.

Figure 4:
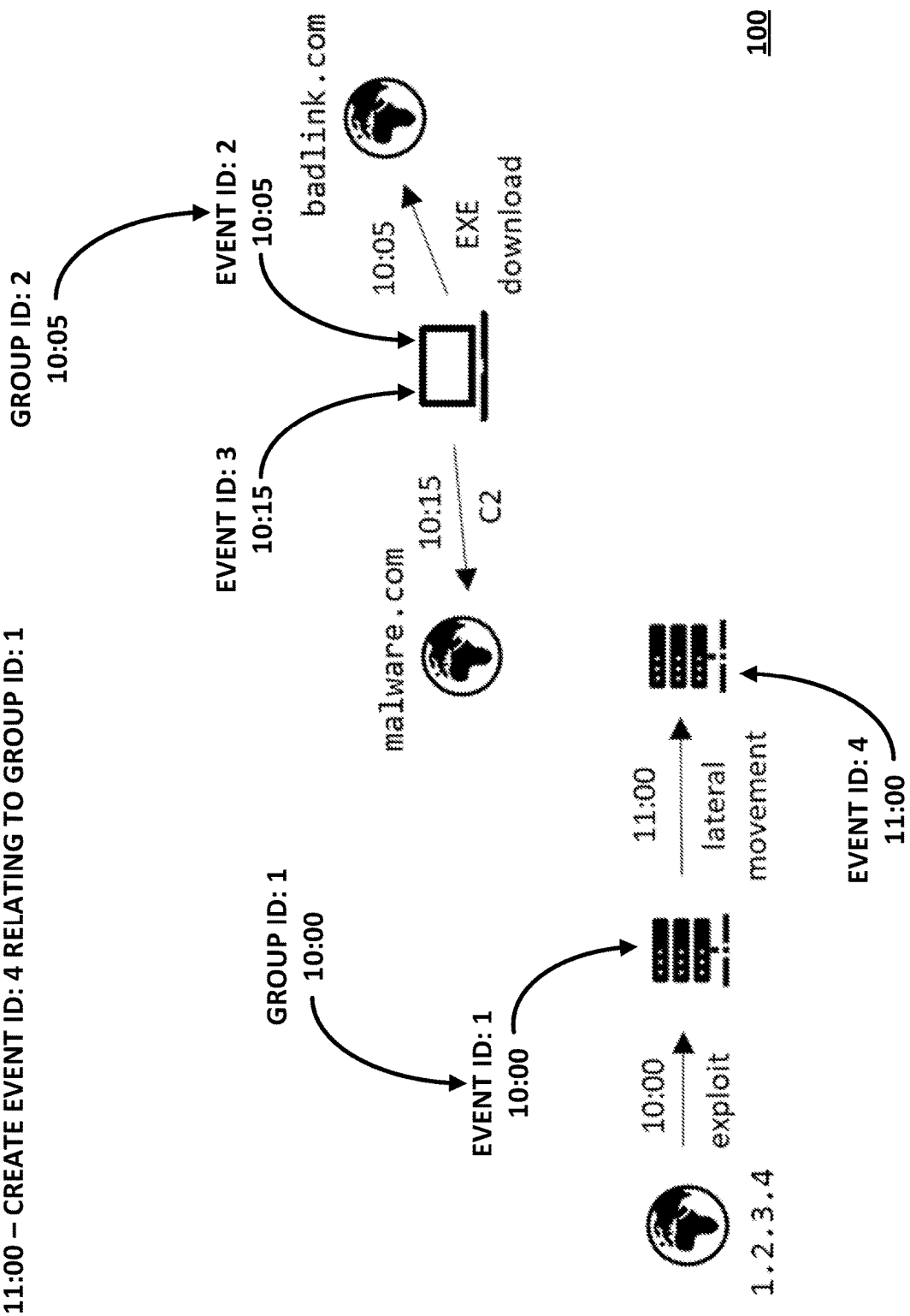
FIG. 4 illustrates a block diagram of the reaction of the cyber-security appliance to the fourth event of the cyber-attack incident on the exemplary system of FIG. 1 in accordance with an embodiment of the disclosure.

Referring to FIG. 4, a block diagram of the reaction of the cyber-security appliance to the fourth event of the cyber-attack incident on the exemplary system of FIG. 1 in accordance with an embodiment of the disclosure is shown. At time 11:00, a fourth event (a lateral movement activity from one internal server node to another) may be detected and tagged EVENT ID: 4. Since it may be associated with GROUP ID:1 may be tagged as such. At this time, there may still be no reason for the CSA to know if there is an association between GROUP ID: 1 and GROUP ID: 2.

Figure 5:
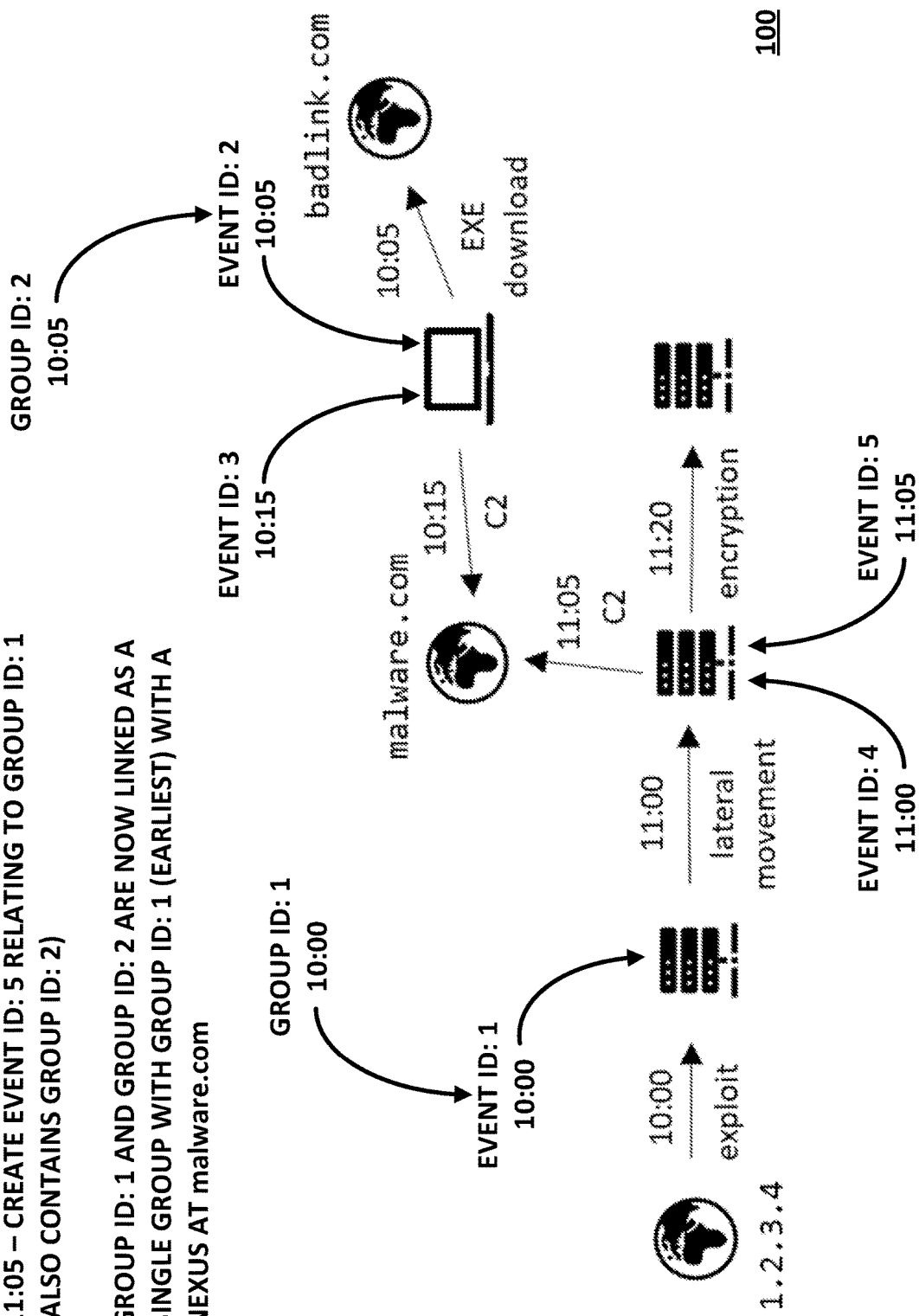
FIG. 5 illustrates a block diagram of the reaction of the cyber-security appliance to the fifth event of the cyber-attack incident on the exemplary system of FIG. 1 in accordance with an embodiment of the disclosure.

Referring to FIG. 5, a block diagram of the reaction of the cyber-security appliance to the fifth event of the cyber-attack incident on the exemplary system of FIG. 1 in accordance with an embodiment of the disclosure is shown. At time 11:05, another event (a C2 access to "malware.com" from the second internal server node) may be detected and tagged EVENT ID: 5. Because of the nexus involving malware-.com, EVENT ID: 3, and EVENT ID: 5, the CSA recognizes that GROUP ID: 1 and GROUP ID: 2 may be part of the same cyber-attack. Thus, all of the GROUP ID: 2 events may now be treated as a part of a single and larger GROUP ID: 1. The GROUP ID:2 tags of the former members of that group are retained to assist later reconstruction of the order of events. On the graphical display of the CTAI, the two previous subgraphs are now displayed as a single subgraph. If this were the only activity shown so far, this would be the entire graph of the CTAI.

Figure 6:
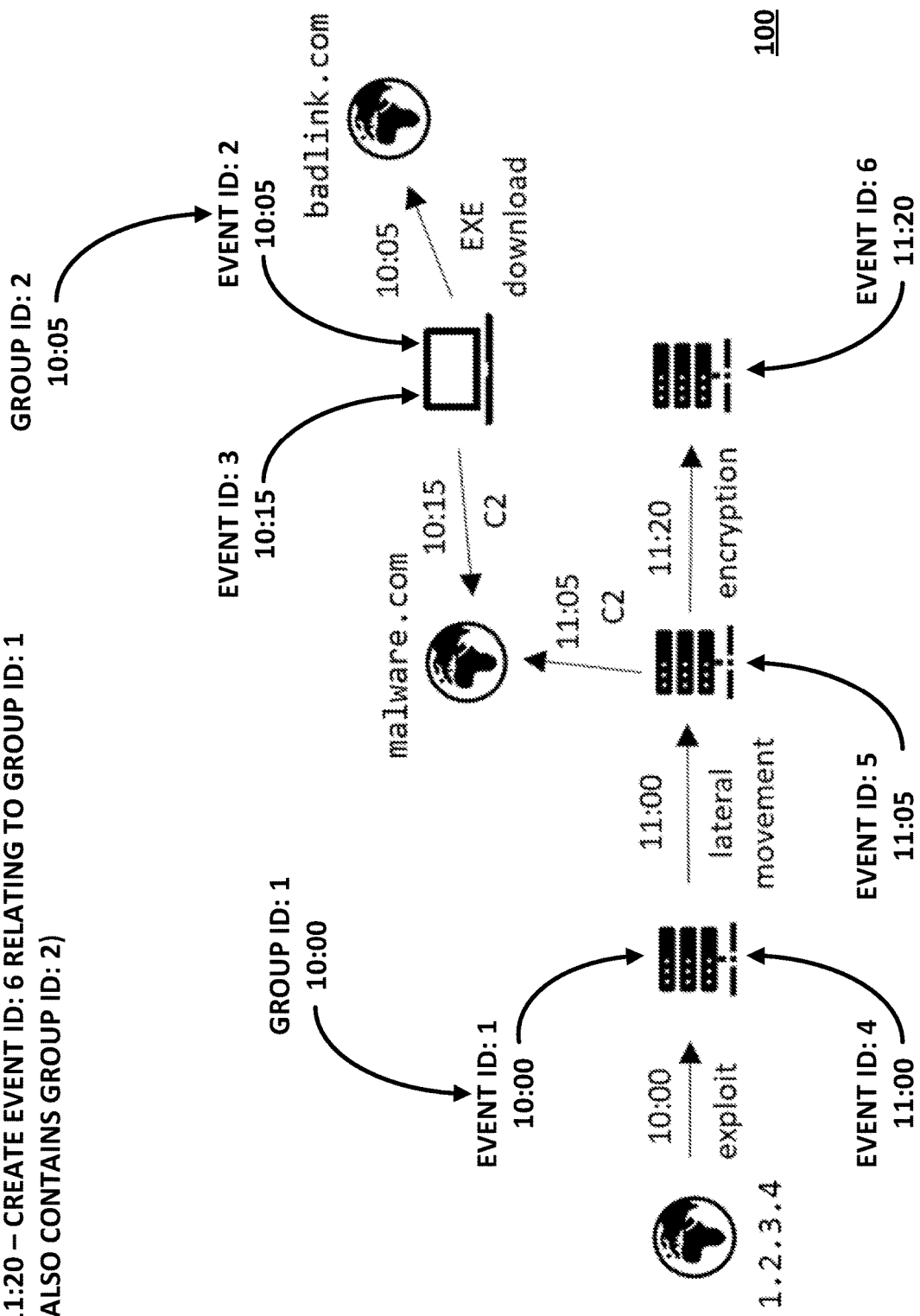
FIG. 6 illustrates a block diagram of the reaction of the cyber-security appliance to the sixth event of the cyber-attack incident on the exemplary system of FIG. 1 in accordance with an embodiment of the disclosure.

Referring to FIG. 6, a block diagram of the reaction of the cyber-security appliance to the sixth event of the cyber-attack incident on the exemplary system of FIG. 1 in accordance with an embodiment of the disclosure is shown. At time 11:20, an encryption attack event may be detected on a third server and may be tagged EVENT ID: 6 and tentatively tagged GROUP ID: 1.

Persons skilled in the art will realize that the cyber-attack described with respect to FIGS. 1-6 is exemplary only to aid in understanding the operation of the CSA, the CTAM, and other modules. Such skilled persons will realize there are a huge number of possible systems and possible cyber-attacks, and the use of the CSA described above is generalizable to all of them and within the scope of the disclosure.

Figure 7A:
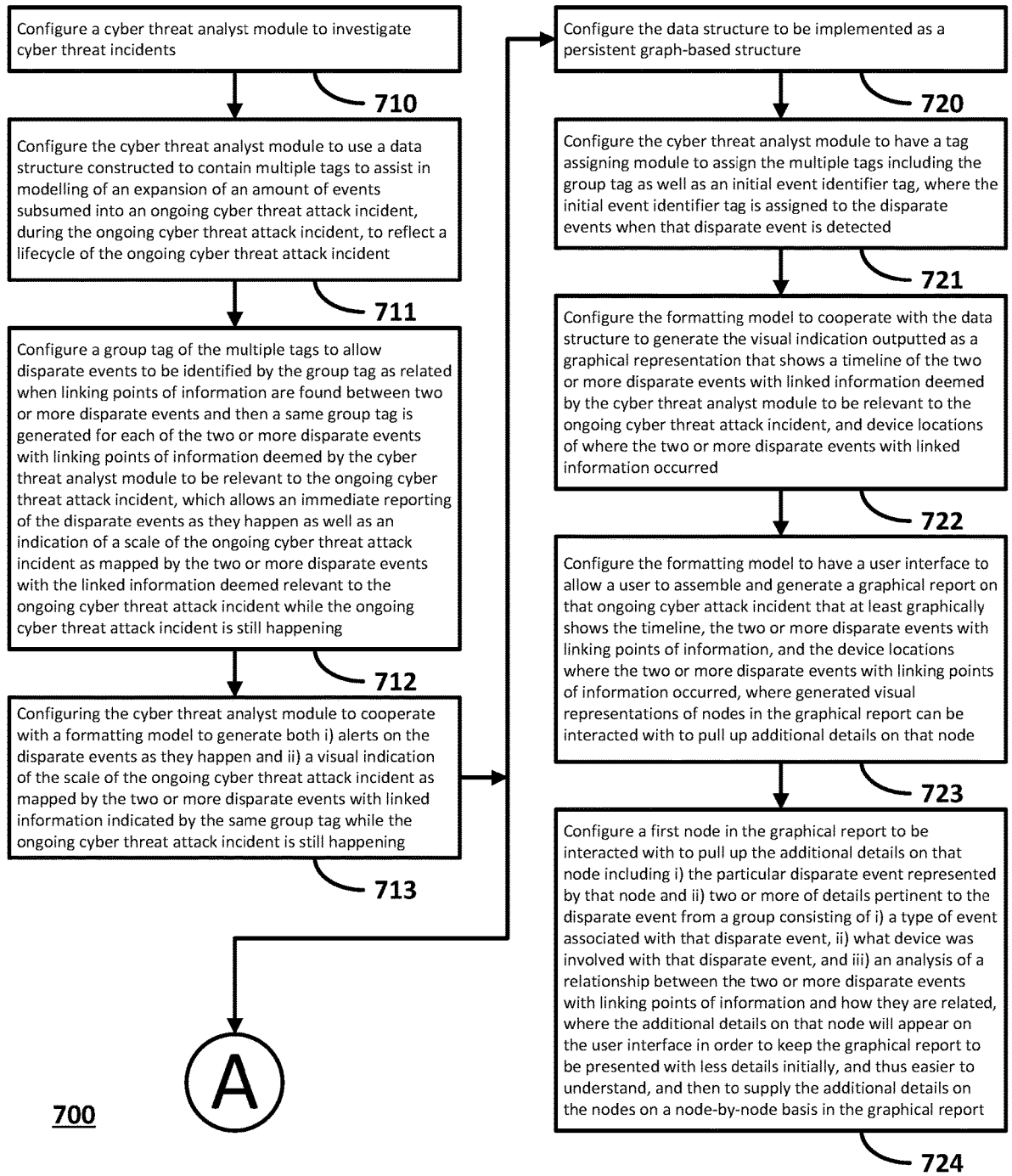
FIG. 7A illustrates a first portion of a process of operating an artificial intelligence based cyber-security appliance in accordance with an embodiment of the disclosure.

Referring to FIG. 7A, a first portion of a process 700 of operating an artificial intelligence based cyber-security appliance in accordance with an embodiment of the disclosure is shown. Process 700 may begin by configuring a cyber threat analyst module to investigate cyber threat incidents (block 710) and further configuring the cyber threat analyst module to use a data structure constructed to contain multiple tags to assist in modeling an expansion of an amount of events subsumed into an ongoing cyber threat attack incident, during the ongoing cyber threat attack incident, to reflect a lifecycle of the ongoing cyber threat attack incident (block 711).

Process 700 may further configure a group tag of the multiple tags to allow disparate events to be identified by the group tag as related when linking points of information are found between two or more disparate events and then a same group tag is generated for each of the two or more disparate events with linking points of information deemed by the cyber threat analyst module to be relevant to the ongoing cyber threat attack incident, which allows an immediate reporting of the disparate events as they happen as well as an indication of a scale of the ongoing cyber threat attack incident as mapped by the two or more disparate events with the linked information deemed relevant to the ongoing cyber threat attack incident while the ongoing cyber threat attack incident is still happening (block 712), and further configure the cyber threat analyst module to cooperate with a formatting module to generate both i) alerts on the disparate events as they happen and ii) a visual indication of the scale of the ongoing cyber threat attack incident as mapped by the two or more disparate events with linked information indicated by the same group tag while the ongoing cyber threat attack incident is still happening (block 713).

At this point in process 700, several different subprocesses may occur, and this branching off point is designated by the letter "A" inside a circle in FIG. 7A and will be referred to as "branch point A" hereafter. It should be noted that these subprocesses are not mutually exclusive, and in some embodiments, subprocesses may occur simultaneously to one another, while in other embodiments, subprocesses may occur in reverse order to that depicted in a flowchart.

Continuing from branch point A, process 700 may further configure the data structure to be implemented as a persistent graph-based structure (block 720), and further configure the cyber threat analyst module to have a tag assigning module to assign the multiple tags including the group tag as well as an initial event identifier tag, where the initial event identifier tag is assigned to the disparate events when that disparate event is detected (block 721).

The process 700 may further configure the formatting module to cooperate with the data structure to generate the visual indication outputted as a graphical representation that shows a timeline of the two or more disparate events with linked information deemed by the cyber threat analyst module to be relevant to the ongoing cyber threat attack incident, and device locations of where the two or more disparate events with linked information occurred (block 722), and then further configure the formatting module to have a user interface to allow a user to assemble and generate a graphical report on that ongoing cyber-attack incident that at least graphically shows the timeline, the two or more disparate events with linking points of information, and the device locations where the two or more disparate events with linking points of information occurred, where generated visual representations of nodes in the graphical report can be interacted with to pull up additional details on that node (block 723).

Process 700 may continue and configure a first node in the graphical report to be interacted with to pull up the additional details on that node including i) the particular disparate event represented by that node and ii) two or more of details pertinent to the disparate event from a group consisting of i) a type of event associated with that disparate event, ii) what device was involved with that disparate event, and iii) an analysis of a relationship between the two or more disparate events with linking points of information and how they are related, where the additional details on that node will appear on the user interface in order to keep the graphical report to be presented with less details initially, and thus easier to understand, and then to supply the additional details on the nodes on a node-by-node basis in the graphical report (block 724).

Referring to FIG. 7B, a second portion of the process 700 of operating an artificial intelligence based cyber-security appliance in accordance with an embodiment of the disclosure is shown. Continuing from branch point A, process 700 may continue by further configuring the cyber threat analyst module to conduct the investigation on cyber threat incidents attacking the system protected by the cyber security appliance by having at least one of i) an API to one or more additional third-party cyber security protection tools and ii) a routine to gather additional information from one or more additional third-party cyber security protection tools in order to evaluate the quality of at least one of 1) alerts coming from the one or more additional third-party cyber security protection tools, 2) third-party data coming from the one or more additional third-party cyber security protection tools, and 3) any combination of both, by correlating the alerts reported from the one or more additional third-party cyber security protection tools to results of the investigation on the cyber threat incidents attacking the system conducted by the cyber threat analyst module (block 730).

The process 700 may further configure the cyber threat analyst module to cooperate with the formatting module to generate a validity understanding of a fidelity of alerts that were fed to the cyber threat analyst module from third-party tools by correlating whether those alerts were actually part of a particular cyber-attack incident, or whether those alerts were not part of any cyber-attack incident; and thus, deemed a false positive (block 731).

Referring to FIG. 7C, a third portion of the process of operating an artificial intelligence based cyber-security appliance in accordance with an embodiment of the disclosure is shown. Continuing from branch point A, the process 700 may continue by further configuring the data structure to contain the multiple tags to allow the cyber threat analyst module to utilize the multiple tags as the cyber threat analyst module accumulates information about a particular event occurring in an ongoing cyber attack incident, and then assign a first group tag to the two or more disparate events with linking points of information as the linking points are found to be likely between a first disparate event and a second disparate event to tie these events as likely related while still retaining initial information contained in both a first initial event identifier tag assigned to the first disparate event and a second initial event identifier tag assigned to the second disparate event (block 740), and then further configure the cyber threat analyst module to use the retained initial information contained in at least one of the first initial event identifier tag assigned to the first disparate event and the second initial event identifier tag assigned to the second disparate event to link pieces of information contained in at least one of the first initial event identifier tag and the second initial event identifier tag with a third disparate event when the third disparate event has not yet been confirmed as being related to the first group tag assigned to the first disparate event and the second disparate event, wherein the multiple tags preserve original information captured in the initial event identifier tag so that the cyber threat analyst module still can go back and piece information together via a use of the information in the multiple tags (block 741).

Referring to FIG. 7D, a fourth portion of the process of operating an artificial intelligence based cyber-security appliance in accordance with an embodiment of the disclosure is shown. Continuing from branch point A, process 700 may continue by further configuring a tag assigning module in the cyber threat analyst module to cooperate with the data structure to i) uniquely identify the initial event identifier tags, and ii) assign the group tags in a consistent and cumulative manner, as well as have a structure to contain an analysis from machine learning on potential relationships of information in light of each other and how the relationships of information relate to potential cyber threats that could be attacking the system (block 750).

Referring to FIG. 7E, a fifth portion of the process of operating an artificial intelligence based cyber-security appliance in accordance with an embodiment of the disclosure is shown. Continuing from branch point A, the process 700 may continue by further configuring the formatting module to 1) apply a plurality of different colors to convey commonality and differences between a plurality of generated visual representations in the graphical report corresponding to the two or more disparate events with linking points of information to assist in an understanding of the graphical report as well as 2) present the visual representations positionally within a network in relation to other devices involved in the cyber threat attack and/or geographically in relation to other devices involved in the cyber threat attack (block 760).

Referring to FIG. 7F, a sixth portion of the process of operating an artificial intelligence based cyber-security appliance in accordance with an embodiment of the disclosure is shown. Continuing from branch point A, the process 700 may continue by further configuring the cyber threat analyst module to investigate the cyber threat incidents by cooperation with one or more of the group consisting of: one or more artificial intelligence models trained on how human cyber security analysts conduct an investigation on a possible set of cyber threats hypotheses, one or more scripts outlining how to conduct an investigation on a possible set of cyber threats hypotheses, and one or more rules-based models on how to conduct an investigation on a possible set of cyber threats hypotheses (block 770).

Figure 8:
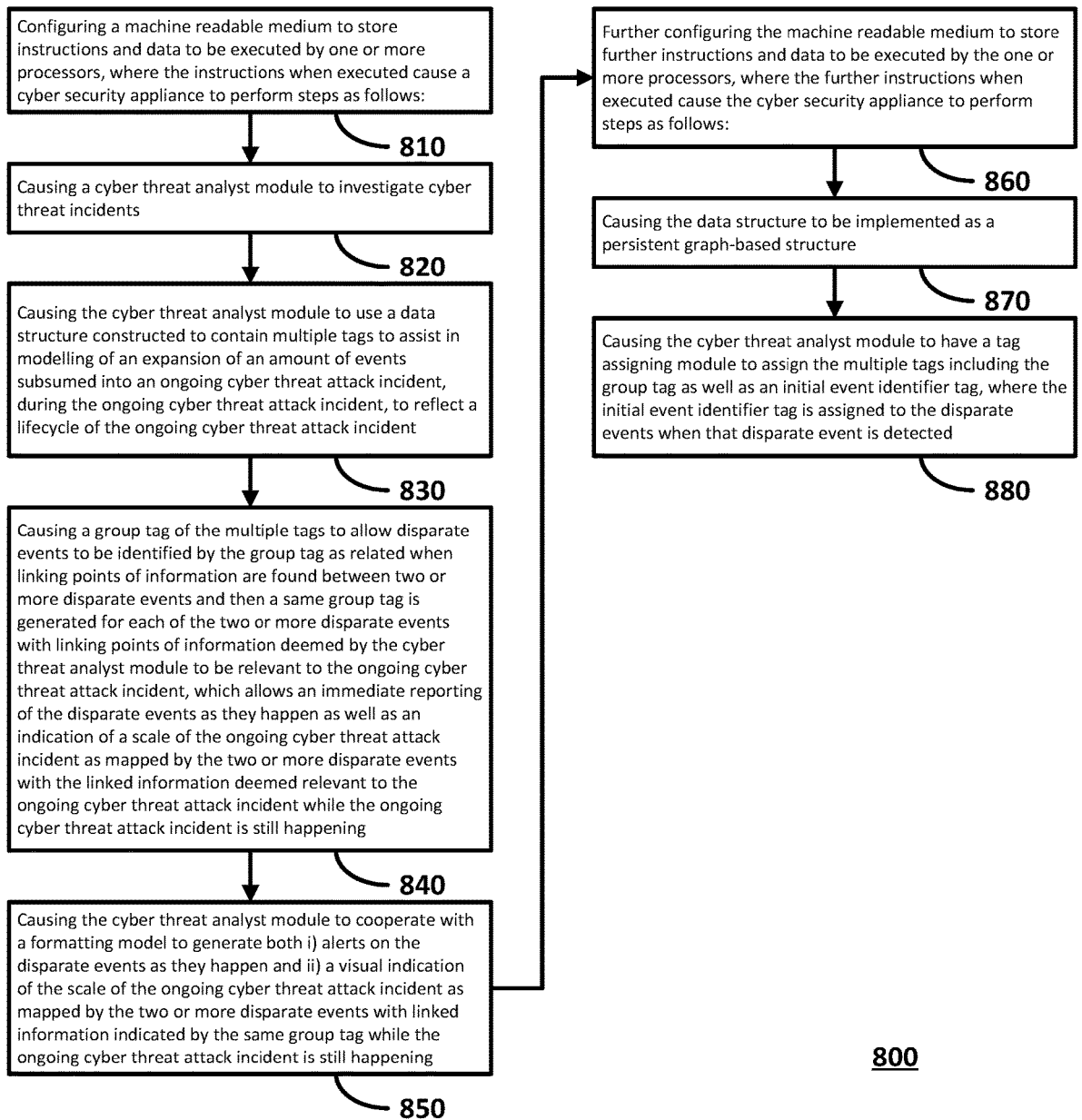
FIG. 8 illustrates a process of operating an artificial intelligence based cyber-security appliance using the steps stored in a machine-readable medium in accordance with an embodiment of the disclosure.

Referring to FIG. 8, a process 800 of operating an artificial intelligence based cyber-security appliance using the steps stored in a machine-readable medium in accordance with an embodiment of the disclosure is shown. Process 800 may begin by configuring a machine readable medium to store instructions and data to be executed by one or more processors, where the instructions, when executed, cause a cyber security appliance to perform the following steps (block 810). Process 800 may continue by performing the step of causing a cyber threat analyst module to investigate cyber threat incidents (block 820). Process 800 may continue further by performing the step of causing the cyber threat analyst module to use a data structure constructed to contain multiple tags to assist in modeling of an expansion of an amount of events subsumed into an ongoing cyber threat attack incident, during the ongoing cyber threat attack incident, to reflect a lifecycle of the ongoing cyber threat attack incident (block 830).

Process 800 may proceed by performing the step of causing a group tag of the multiple tags to allow disparate events to be identified by the group tag as related when linking points of information are found between two or more disparate events and then a same group tag is generated for each of the two or more disparate events with linking points of information deemed by the cyber threat analyst module to be relevant to the ongoing cyber threat attack incident, which allows an immediate reporting of the disparate events as they happen as well as an indication of a scale of the ongoing cyber threat attack incident as mapped by the two or more disparate events with the linked information deemed relevant to the ongoing cyber threat attack incident while the ongoing cyber threat attack incident is still happening (block 840).

Process 800 may continue by performing the step of causing the cyber threat analyst module to cooperate with a formatting module to generate both i) alerts on the disparate events as they happen and ii) a visual indication of the scale of the ongoing cyber threat attack incident as mapped by the two or more disparate events with linked information indicated by the same group tag while the ongoing cyber threat attack incident is still happening (block 850).

Process 800 may continue by performing the step of further configuring the machine readable medium to store further instructions and data to be executed by the one or more processors, where the further instructions, when executed, cause the cyber security appliance to perform the following steps (block 860). Process 800 may proceed by performing the step of causing the data structure to be implemented as a persistent graph-based structure (block 870) and proceed further by performing the step of causing the cyber threat analyst module to have a tag assigning module to assign the multiple tags including the group tag as well as an initial event identifier tag, where the initial event identifier tag is assigned to the disparate events when that disparate event is detected (block 780).

Figure 9:
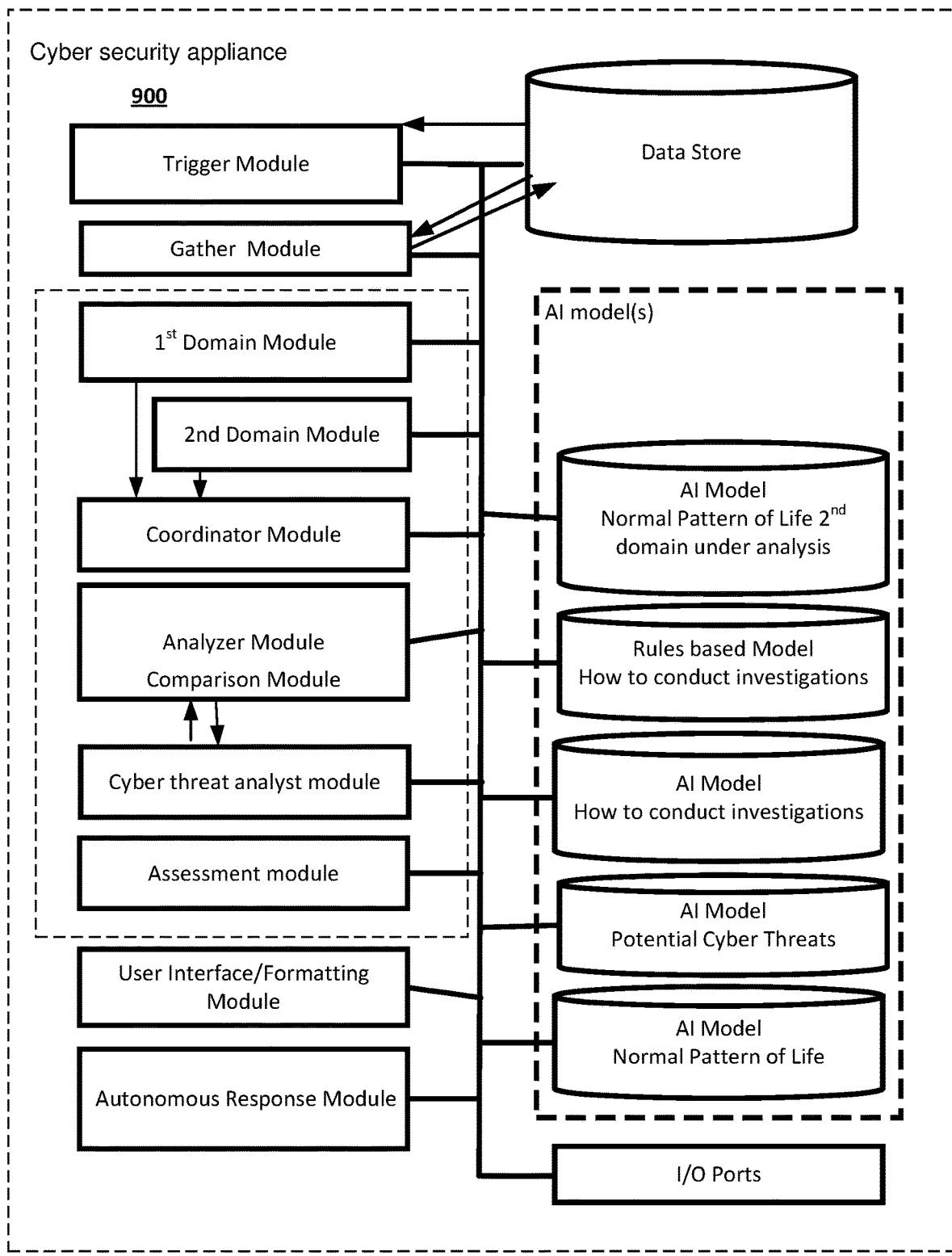
FIG. 9 illustrates a block diagram of an embodiment of the AI based cyber security appliance that protects a system, including but not limited to a network/domain, from cyber threats.

FIG. 9 illustrates a block diagram of an embodiment of the AI based cyber security appliance that protects a system, including but not limited to a network/domain, from cyber threats. Various Artificial Intelligence models and modules of the cyber security appliance 900 cooperate to protect one or more networks/domains under analysis from cyber threats. The AI-based cyber security appliance 900 may include a trigger module, a gatherer module, an analyser module, a cyber threat analyst module, an assessment module, a formatting module, one or more AI models trained with machine learning on a normal pattern of life for entities in the network/domain under analysis, one or more AI models trained with machine learning on cyber threat hypotheses to form and investigate a cyber threat hypothesis on what are a possible set of cyber threats and their characteristics, symptoms, remediations, etc., and one or more AI models trained on possible cyber threats, a data store, an autonomous response module, a 1st domain module, a 2nd domain module, and a coordinator module.

The cyber security appliance 900 with the Artificial Intelligence (AI) based cyber security system may protect a network/domain from a cyber threat. In an embodiment, the cyber security appliance 900 can protect all of the devices on the network(s)/domain(s) being monitored by monitoring domain activity, for example, network traffic going to and from the devices on the network. The steps below will detail the activities and functions of several of the components in the cyber security appliance 900.

A data gather module may have a series of one or more process identifier classifiers. A process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store.

An analyser module can cooperate with other modules and AI models in the cyber security appliance to confirm a presence of a cyber threat attacking one or more domains in an organization's system. A cyber threat analyst module can cooperate with the same other modules and AI models in the cyber security appliance to conduct a long-term investigation and/or a more in-depth investigation on potential cyber threats attacking one or more domains in an organization's system. A process identifier in the analyser module can cooperate with the data gatherer module to collect any additional data and metrics to support a possible cyber threat hypothesis. The analyser module and/or the cyber threat analyst module can also look for other anomalies, such as model breaches, including, for example, deviations for a normal behavior of an entity, and other techniques discussed herein. The analyser module and/or the cyber threat analyst module can cooperate with the AI models trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

The cyber threat analyst module, in essence, allows two levels of investigations of potential cyber threat attacks. In a first level, the analyser module and AI models can rapidly detect and then autonomously respond to overt and obvious cyber threat attacks. However, thousands to millions of low-level anomalies occur in a domain under analysis all of the time; and thus, most other systems need to set the threshold of trying to detect a cyber threat attack at a level higher than the low-level anomalies examined by the cyber threat analyst module just to not have too many false positive indications of a cyber threat attack when one is not actually occurring, as well as to not overwhelm a human cyber analyst receiving the alerts with so many notifications of low-level anomalies that they just start tuning out those alerts. However, advanced persistent threats attempt to avoid detection by making these low-level anomalies in the system over time during their attack before making their final coup de grace/ultimate mortal blow against the domain being protected. The cyber threat analyst module conducts investigations over time that can detect these advanced persistent cyber threats actively trying to avoid detection by looking at one or more of these low-level anomalies as a part of a chain of linked information.

The cyber threat analyst module forms and investigates hypotheses on what are a possible set of cyber threats and can also cooperate with the analyser module with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the one or more AI models trained with machine learning on the normal pattern of life of entities in the system. (For example, see FIG. 10, the cyber threat analyst module will perform several additional rounds of gathering additional information over a period of time, in this example, examining data over a 7-day period to determine causal links between the information.) The cyber threat analyst module will submit to check and recheck various combinations/a chain of potentially related information under analysis until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported nor refuted; and thus, needs a human to further investigate the anomaly of interest included in the chain of potentially related information. Note, a data analysis process can be algorithms/scripts written by humans to perform their function discussed herein and can, in various cases, use AI classifiers as part of their operation. Note, any portions of the AI based cyber security appliance 900 implemented as software can be stored in one or more non-transitory memory storage devices in an executable format to be executed by one or more processors.

Again, an input from the cyber threat analyst module of a supported hypothesis of a potential cyber threat will trigger the analyser module to compare, confirm, and act on that cyber threat. In contrast, the cyber threat analyst module investigates subtle indicators and/or initially seemingly isolated unusual or suspicious activity such as a worker is logging in after their normal working hours or a simple system misconfiguration has occurred. Most of the investigations conducted by the cyber threat analyst module on unusual or suspicious activities/behavior may not result in a cyber threat hypothesis that is supported, but rather most are refuted or simply not supported. Typically, during the investigations, several rounds of data gathering to support or refute the long list of potential cyber threat hypotheses formed by the cyber threat analyst module will occur before the algorithms in the cyber threat analyst module will determine whether a particular cyber threat hypothesis is supported, refuted, or needs further investigation by a human. The rounds of data gathering will build chains of linked low-level indicators of unusual activity along with potential activities that could be within a normal pattern life for that entity to evaluate the whole chain of activities to support or refute each potential cyber threat hypothesis formed. (See again, for example, FIG. 10 and a chain of linked low-level indicators all under a 50 on a threat indicator score). The investigations by the cyber threat analyst module can happen over a relatively long period of time and be far more in-depth than the analyser module, which will work with the other modules and AI models to confirm that a cyber threat has, in fact, been detected.

The data gatherer module may further extract data from the data store at the request of the cyber threat analyst module and/or analyser module on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The data gatherer module cooperates with the cyber threat analyst module and/or analyser module to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

The cyber threat analyst module is configured to form and investigate hypotheses on what are a possible set of cyber threats and can cooperate with the analyser module with the one or more data analysis processes to confirm the results of the investigation on the possible set of cyber threats hypotheses that would include the at least one of i) the abnormal behavior, ii) the suspicious activity, and iii) any combination of both, identified through cooperation with the one or more AI models trained with machine learning on the normal pattern of life of entities in the domains under analysis.

Likewise, the data gatherer module and the analyser module cooperate in supplying further data and/or metrics requested by the analyser module when attempting to support or rebut each cyber threat hypothesis. Again, the analyser module can cooperate with the other modules and AI models to rapidly detect and then autonomously respond to overt and obvious cyber threat attacks (including ones found to be supported by the cyber threat analyst module).

As a starting point, the AI-based cyber security appliance 900 can use the trigger module to identify abnormal behavior and/or suspicious activity against the AI models of normal behavior for the entities in the network/domain under analysis, which is supplied to the analyser module and/or the cyber threat analyst module. The analyser module and/or the cyber threat analyst module may also receive other inputs such as AI model breaches, AI classifier breaches, a trigger to start an investigation from an external source, etc. For example, anomalies that can trigger an investigation, i) an analysis of the JA3 hashes of the secured connection and/or ii) an analysis of user agent data of unsecured connections that are rare for that network, etc. can be further examined in order to identify abnormal behavior and/or suspicious activity; and thus, determine whether a likelihood exists that malicious activity with a given agent on the secured connection or unsecured connection, as appropriate, is likely occurring.

Many other model breaches of the AI models trained with machine learning on the normal behavior of the system can send an input into the cyber threat analyst module and/or the trigger module to trigger an investigation to start the formation of one or more hypotheses on what is a possible set of cyber threats that could include the initially identified abnormal behavior and/or suspicious activity. Note, a deeper analysis of the i) JA3 hashes when monitoring and analyzing a secured connection and/or analysis of user agent data when monitoring and analyzing an unsecured connection can also be used as additional data to help support or refute possible cyber threat hypotheses. For example, the deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module in the AI-based cyber security appliance 900 provides an advantage as it reduces the time taken for human-led or cybersecurity investigations, provides an alternative to manpower for small organizations, and improves detection (and remediation) capabilities within the cyber security platform.

The cyber threat analyst module that forms and investigates hypotheses on what are the possible set of cyber threats can use hypotheses mechanisms including any of 1) one or more AI models trained on how human cyber security analysts conduct an investigation on a possible set of cyber threats hypotheses that would include at least an anomaly of interest, 2) one or more scripts outlining how to conduct an investigation on a possible set of cyber threats hypotheses that would include at least the anomaly of interest, 3) one or more rules-based models on an investigation on a possible set of cyber threats hypotheses how to conduct an investigation on a possible set of cyber threats hypotheses that would include at least the anomaly of interest, and 4) any combination of these. Again, the AI models may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses.

Training of AI Pre-Deployment and then During Deployment

In step 1, an initial training of Artificial Intelligence models trained on cyber threats can occur using unsupervised learning and/or supervised learning on characteristics and attributes of known potential cyber threats, including malware, insider threats, and other kinds of cyber threats that can occur within that domain. The AI model learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. The AI models can be trained with machine learning on possible cyber threats such as Linear Regression, Regression Trees, Non-Linear Regression, Bayesian Linear Regression, Deep learning, etc., to learn and understand the characteristics and attributes in that category of cyber threats. Later, when in deployment in a domain/network being protected by the cyber security appliance 900, the AI model can determine whether a potentially unknown threat has been detected via a number of techniques, including an overlap of some of the same characteristics and attributes in that category of cyber threats.

Likewise, pre-deployment machine learning training of one or more Artificial Intelligence models trained on a normal behavior of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment, or alternatively, the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model, such as various Bayesian techniques, clustering, etc. The AI models can be implemented with various mechanisms such as neural networks, decision trees, etc., and combinations of these. Likewise, one or more supervised machine learning AI models are trained to create possible hypotheses and perform cyber threat investigations on agnostic examples of past historical incidents of detecting a multitude of possible types of cyber threat hypotheses previously analyzed by human cyber threat analysis. More on the training of AI models are trained to create one or more possible hypotheses and perform cyber threat investigations will be discussed later.

As discussed in more detail below, the analyser module can cooperate with the one or more unsupervised machine learning models trained on the normal pattern of life in order to perform anomaly detection against the actual normal pattern of life for that system to determine whether an anomaly (e.g., the identified abnormal behavior and/or suspicious activity) is malicious or benign. In operation of the cyber security appliance 900, the potential cyber threat can be previously unknown but shares enough (or does not share enough) in common with the traits from the AI models trained on cyber threats to now be identified as malicious or benign. Note, if later confirmed as malicious, then the AI models trained with machine learning on possible cyber threats can update their training. Likewise, as the cyber security appliance 900 continues to operate, then the one or more machine learning models trained on a normal pattern of life for each of the entities in the system can be updated and trained with unsupervised machine learning algorithms. The analyser module can use any number of data analysis processes (discussed more in detail below and including the agent analyser data analysis process here) to help obtain system data points so that this data can be fed and compared to the one or more machine learning models trained on a normal pattern of life, as well as the one or more machine learning models trained on potential cyber threats, as well as create and store data points with the connection finger prints.

All of the above AI models can continually learn and train with unsupervised machine learning algorithms on an ongoing basis when deployed in their system that the cyber security appliance 900 is protecting.

Next, as discussed further below, during pre-deployment, the analyser module uses data analysis processes and cooperates with AI models trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses, including what additional collected data proved to be the most useful.

Similarly, during deployment, the data analysis processes (discussed herein) used by the analyser module can use unsupervised machine learning to update the initial training learned during pre-deployment, and then update the training with unsupervised learning algorithms during the cyber security appliance's 900 deployment in the system being protected when various different steps to either i) support or ii) refute the possible set of cyber threats hypotheses worked better or worked worse.

The AI models trained on a normal behavior of entities in a domain under analysis may perform the threat detection through a probabilistic change in a normal behavior through the application of, for example, an unsupervised Bayesian mathematical model to detect behavioral change in computers and computer networks. The Bayesian probabilistic approach can determine periodicity in multiple time series data and identify changes across single and multiple time series data for the purpose of anomalous behavior detection. In an example of email and IT network domains under analysis, email and IT network raw sources of data can be examined along with a large number of derived metrics that each produce time series data for the given metric.

A Little More on the Modules' Interactions

The gatherer module cooperates with a data store. The data store stores comprehensive logs for network traffic observed. These logs can be filtered with complex logical queries, and each IP packet can be interrogated on a vast number of metrics in the network information stored in the data store. The gatherer module may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The data store can store the metrics and previous threat alerts associated with network traffic for a period of time, which is, by default, at least 27 days. This corpus of data is fully searchable. The cyber security appliance 900 works with network probes to monitor network traffic and store and record the data and metadata associated with the network traffic in the data store.

The data gather module may have a process identifier classifier. The process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store.

Examples of domains/networks under analysis can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain. A first domain module can be an IT network module configured to receive information from and send information to, in this example, IT network-based sensors (i.e., probes, taps, etc.). The first domain module also has algorithms and components configured to understand, in this example, IT network parameters, IT network protocols, IT network activity, and other IT network characteristics of the network under analysis. A second domain module is, in this example, an email module. A second domain module can be an email network module configured to receive information from and send information to, in this example, email-based sensors (i.e., probes, taps, etc.). The second domain module also has algorithms and components configured to understand, in this example, email parameters, email protocols and formats, email activity, and other email characteristics of the network under analysis. A third or more domain modules can also collect domain data from even another domain. The coordinator module is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier in the data gather module can cooperate with additional classifiers in each of the domain modules to assist in tracking individual processes and associating them with entities in a domain under analysis as well as individual processes and how they relate to each other. An agent analyser data analysis process can be configured to compute JA3 hashes and analyze user agent data every time a secure communication connection happens in order to calculate the 'process connection fingerprints' derived from the user agent data and/or JA3 data. The process identifier classifier can cooperate with other trained AI classifiers in the modules, such as the agent analyser configured to apply the JA3 hash function to network traffic transiting over a secure communication connection in order to generate process connection fingerprints, which can also be stored in the data store. The fingerprints can supply useful metadata along with helping to make logical nexuses. The process connection fingerprints contain multiple characteristics of the endpoint connection.

A feedback loop of cooperation exists between the gatherer module, the analyser module, one or more models trained on different aspects of this process, and the cyber threat analyst module to gather information to determine whether a cyber threat is potentially attacking the networks/domains under analysis.

Determination of Whether Something is Likely Malicious.

In the following examples, the analyser module and/or cyber threat analyst module can use multiple factors to the determination of whether a process, event, object, entity, etc., is likely malicious.

In an example, the analyser module and/or cyber threat analyst module can cooperate with the Artificial Intelligence models trained on potential email cyber threats to detect whether the anomalous activity detected, such as suspicious emails, exhibit traits that may suggest malicious intent, such as phishing links, scam language, sent from suspicious domains, etc. The analyser module and/or cyber threat analyst module can also cooperate with the Artificial Intelligence models trained on potential IT-based cyber threats to detect whether the anomalous activity detected, such as suspicious IT links, URLs, domains, user activity, etc., may suggest a malicious intent as indicated by the Artificial Intelligence models trained on potential IT-based cyber threats.

In the above example, the analyser module and/or cyber threat analyst module can cooperate with the one or more Artificial Intelligence models trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyser module and/or cyber threat analyst module can cooperate with the one or more Artificial Intelligence models trained with machine learning on the normal pattern of life for entities in a second domain under analysis (in this example, an IT network) to detect, in this example, anomalous network activity by user and/or devices in the network, which is detected as outside of the usual pattern of life for each entity, such as a user or a device, of the second domain's network under analysis.

Thus, the analyser module and/or cyber threat analyst module can be configured with one or more data analysis processes to cooperate with the one or more AI models trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this threat determination process, the analyser module and/or cyber threat analyst module can also use one or more data analysis processes grabbing data from the range of data analysis processes to produce features for the AI classifiers, including i) an agent analyser, ii) an Ngram data analysis process, iii) an exfiltration data analysis process, iv) a network scan data analysis process, and other similar processes. The AI classifiers can look at the features and determine a potential maliciousness based on commonality or overlap with known characteristics of malicious processes/entities. Many factors, including anomalies that include unusual and suspicious behavior and other indicators of processes and events, are examined by the one or more AI models trained on potential cyber threats and/or the AI classifiers looking at specific features for their malicious nature in order to make a determination of whether an individual factor and/or whether a chain of anomalies is determined to be likely malicious.

The agent analyser can be coded to analyze user agent/resident process data and detect the cyber threat, such as a malicious agent, previously unknown to the system, using, for example, 1) an analysis of JA3 hashes when monitoring and analyzing a secured communication connection without needing to decrypt content in network traffic or 2) an analysis of user agent/resident process data when monitoring and analyzing an unsecured communication connection. The Ngram data analysis process can be coded to assess an address string under analysis to determine the address string's 1) similarity to or 2) anomaly from known good and bad populations of address strings. The exfiltration data analysis process can be coded to identify and correlate 1) data transfers to one or more online services as well as 2) data transfers to one or more other external network locations when multiple different Internet Protocol (IP) addresses exist for that online service or that other external network location. The network scan data analysis process can be coded to create a virtual tree of IP address space to detect when abnormal scans of one or more IP address ranges occur. Also, the analyser module can use one or more of the above four data analysis processes to determine or otherwise obtain a collection of additional system data points, with the data gather module's assistance, to either support or refute the one or more possible cyber threat hypotheses.

Note, JA3 can be a methodology for connection fingerprinting by creating a hash of, for example, five decimal fields of the Client Hello message that is sent in the initial stages of a Transport Layer Security/SSL session. A secure/encrypted protocol such as HTTPS can establish a Transport Layer Security/SSL session. The user agent can be a software agent or resident process that is acting on behalf of a user on a device, such as a web browser that "retrieves, renders and facilitates end-user interaction with Web content, an email reader, an operating system, an application, etc. However, the user agent may also be malware software and potentially an advanced persistent cyber threat, not acting on behalf of or at the request of a user.

Initially, in this example of activity in an IT network analysis, the rare JA3 hash and/or rare user agent connections for this network coming from a new or unusual process are factored. These are quickly determined by referencing the one or more AI models trained with machine learning on the pattern of life of each device and its associated processes in the system. Next, the analyser module and/or cyber threat analyst module can have an external input to ingest threat intelligence from other devices in the network cooperating with the cyber security appliance 900. For example, in terms of JA3, as it is increasingly used for threat intelligence, the analysis module may be able to ingest from third-party sources and not be limited to just an internal data store of identified bad JA3 fingerprints. Another example factor analyzed can be—is the process running as a distinct process, and a deeper analysis of what are the characteristics of the range of distinct endpoints being connected to. Next, the analyser module and/or cyber threat analyst module can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analysis module and/or cyber threat analyst module can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc., to identify the maliciousness of features looked at.

The analysis module and/or cyber threat analyst module using the supervised machine learning can determine other malicious features such as a detection of domain fronting, without having to break up and break into encrypted traffic, possible by instead combining unusual JA3 detection with other anomalies, such as beaconing. This is a good trigger to start hunting for a domain fronting threat hunt.

Another example of features looked at. A deeper analysis of endpoint data can include things like the domain metadata itself that can reveal peculiarities, and as such one or more indicators of potentially a malicious domain, such as its URL, then this could help confirm an analysis to determine that indeed a cyber threat has been detected. The analysis module can also look at factors of how rare the endpoint connection is, how old the endpoint is, where geographically the endpoint is located, how a security certificate associated with a communication is verified only by endpoint or by external third-party, just to name a few additional factors. The analysis module (and similarly the cyber threat analyst module) can then assign weighting given to these factors in the machine learning that can be supervised based on how strongly that characteristic has been found to match up to actual malicious sites in the training.

The cyber threat analyst module and/or analyser module in the AI based cyber security appliance 900 can catch malicious software and domain fronting with JA3. An example below is where analyser module cooperating with the other modules and AI models detects a malicious C2 communication triggered by observing anomalous JA3 behavior. The unsupervised machine learning algorithms identified a desktop device using a JA3 that was, for example, 95-100% unusual for the network. The process connected to an external domain using a 'Let's Encrypt certificate,' which, along with self-signed certificates, is often abused by malicious actors. As well as the JA3, the domain was also, for example, 90-100% rare for the network—essentially, no other device visited that endpoint destination. All of these unusual and/or suspicious pieces of information can be examined together to determine whether a cyber threat is detected.

The cyber threat analyst module and/or analyser module can detect malicious processes. The unsupervised machine learning using JA3 hashing and/or user agent data can be leveraged as a powerful network behavioral indicator, an additional metric that can flag the use of unauthorized or risky software, or as a means of identifying emerging malware compromises in the initial stages of a C2 communication.

In this example, the malicious actor has registered a domain that is very similar to the victim's legitimate domain, for example, www.companyname[.]com (legitimate domain) vs. www.companyname[.]online (malicious domain). This was intentionally done to avoid suspicion and human analysis. Over a timeframe under analysis, for example, a 7-day period, in a 2,000-device environment, the C2 communication to the external domain of www.companyname[.]online was the only time that the analysis module flagged unusual behavior of this kind.

As the C2 traffic was encrypted as a secured connection (therefore no intrusion detection was possible on the traffic's content payload) and the domain was not known as suspicious (not on reputation-based blacklisting), this C2 traffic would most likely remain undetected by the rest of the security stack.

However, piecing the C2 information with JA3 hashes and/or fingerprints can be incredibly powerful for the detection of domain fronting.

Again, in an embodiment, the cyber-security appliance via the analysis module cooperating with the other modules and AI models can detect domain fronting on encrypted network traffic in transit via TLS/SSL inspection and use of JA3. This can be done without breaking up encrypted communication to inspect the clear-text payloads. This method does not require network restructuring and does not violate privacy issues—especially in the context of GDPR.

In another AI classifier to find potentially malicious indicators, the agent analyser data analysis process in the analyser module and/or cyber threat analyst module may cooperate with the process identifier classifier to identify all of the additional factors of i) are one or more processes running independently of other processes, ii) are the one or more processes running independently recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyser module cyber threat analyst module may use the agent analyser data analysis process that detects a potentially malicious agent previously unknown to the system via using either 1) an analysis of JA3 hashes when monitoring and analyzing a secured communication connection without needing to decrypt content in network traffic or 2) an analysis of user agent data when monitoring and analyzing an unsecured communication connection to start an investigation on one or more possible cyber threat hypotheses. The determination and output of this step is what are possible cyber threats that can include or be indicated by the identified abnormal behavior and/or identified suspicious activity identified by the agent analyser data analysis process.

The analyser module can use the agent analyser data analysis process to create and/or analyze additional data points, including data, metrics, and metadata, obtained from the malicious agent detection using either an analysis of i) JA3 hashes when monitoring and analyzing a secured encrypted connection, like an SSL connection, and an analysis of user agent data when monitoring and analyzing an unsecured connection, to identify abnormal behavior and/or suspicious activity data with the one or more AI models trained with machine learning on possible cyber threats. An initial analysis of the i) JA3 hashes when monitoring and analyzing details of an endpoint of the secured connection and what process and/or device is making that secured connection with the endpoint of the secured connection; and/or analysis of user agent data when monitoring and ii) analyzing an unsecured connection can identify the initial abnormal behavior and/or suspicious activity data.

In this example, the cyber threat analyst module can use the agent analyser data analysis process and the AI models trained on forming and investigating hypotheses on what are a possible set of cyber threats to use the machine learning and/or set scripts to aid in forming one or more hypotheses to support or refute each hypothesis. The cyber threat analyst module can cooperate with the AI models trained on forming and investigating hypotheses to form an initial set of possible hypotheses, which needs to be intelligently filtered down.

The cyber threat analyst module can be configured to use the one or more supervised machine learning models trained on

- agnostic examples of past history of detection of a multitude of possible types of cyber threat hypotheses previously analyzed by human, who was a cyber security professional,
- a behavior and input of how a plurality of human cyber security analysts make a decision and analyze a risk level regarding and a probability of a potential cyber threat,
- steps to take to conduct an investigation start with anomaly via learning how expert humans tackle investigations into specific real and synthesized cyber threats and then the steps taken by the human cyber security professional to narrow down and identify a potential cyber threat, and
- what type of data and metrics were helpful to further support or refute each of the types of cyber threats, in order to determine a likelihood of whether the abnormal behavior and/or suspicious activity is either i) malicious or ii) benign?

The cyber threat analyst module using AI models, scripts, and/or rules-based modules is configured to conduct initial investigations regarding the anomaly of interest, collect additional information to form a chain of potentially related/linked information under analysis, and then form one or more hypotheses that could have this chain of potential information related/link under analysis and then gather additional information in order to refute or support each of the one or more hypotheses.

Figure 10:
FIG. 10 illustrates a graph of an embodiment of an example chain of unusual behavior for, in this example, the email activities deviating from a normal pattern of life in connection with the rest of the network under analysis.

In an example, a behavioral pattern analysis of what are the unusual behaviors of the network/system/device/user under analysis by the machine learning models may be as follows. The coordinator module can tie the alerts, activities, and events from, in this example, the email domain to the alerts, activities, and events from the IT network domain. FIG. 10 illustrates a graph 1000 of an embodiment of an example chain of unusual behavior for, in this example, the email activities deviating from a normal pattern of life in connection with the rest of the network under analysis. The cyber threat analyst module and/or analyser module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by filtering out initially what activities/events/alerts fall within the window of what is the normal pattern of life for that network/system/device/user under analysis, and then the pattern of the behavior of the activities/events/alerts that are left, after the filtering, can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat. An example behavioral pattern analysis of what are the unusual behaviors may be as follows. The unusual pattern may be determined by filtering out what activities/events/alerts fall within the window of what is the normal pattern of life for that network/system/device/user/email under analysis, and then the pattern of the behavior of the activities/events/alerts that are left, after the filtering, can be analyzed to determine whether that pattern is indicative of a behavior of a malicious actor—human, program, email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, as an example, seven days. The defense system detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses, and the user associated with the unusual credentials trying unusual behavior has a causal link to at least one of those three emails with unusual characteristics. Again, the cyber security appliance 900 can go back and pull in some of the filtered out normal activities to help support or refute a possible hypothesis of whether that pattern is indicative of a behavior of a malicious actor. The analyser module can cooperate with one or more models trained on cyber threats and their behavior to try to determine if a potential cyber threat is causing these unusual behaviors. The cyber threat analyst module can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident the system in this assessment of is identifying whether the unusual pattern was caused by a malicious actor is created. Next, also assigned is a threat level score or probability indicative of what level of threat does this malicious actor pose. Lastly, the cyber security appliance 900 is configurable in a user interface, by a user, enabling what type of automatic response actions, if any, the cyber security appliance 900 may take when different types of cyber threats, indicated by the pattern of behaviors under analysis, which are equal to or above a configurable level of threat posed by this malicious actor.

The chain the individual alerts, activities, and events that form the pattern, including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order for Appropriate Autonomous Actions, for Example, Those by the Autonomous Response Module In the next step, the analyser module and/or cyber threat analyst module generates one or more supported possible cyber threat hypotheses from the possible set of cyber threat hypotheses. The analyser module generates the supporting data and details of why each individual hypothesis is supported or not. The analyser module can also generate one or more possible cyber threat hypotheses and the supporting data and details of why they were refuted.

In general, the analyser module cooperates with the following three sources. The analyser module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 900. The analyser module cooperates with the AI models trained on the normal behavior of entities in the network under analysis. The analyser module cooperates with various AI-trained classifiers. With all of these sources, when they input information that indicates a potential cyber threat that is i) severe enough to cause real harm to the network under analysis and/or ii) a close match to known cyber threats, then the analyser module can make a final determination to confirm that a cyber threat likely exists and send that cyber threat to the assessment module to assess the threat score associated with that cyber threat. Certain model breaches will always trigger a potential cyber threat that the analyser will compare and confirm the cyber threat.

In the next step, an assessment module with the AI classifiers is configured to cooperate with the analyser module. The analyser module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyser module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyser module, which includes the abnormal behavior or suspicious activity as well as one or more of the collection of system data points, with the one or more AI models trained on possible cyber threats.

The cyber threat analyst module in the AI-based cyber security appliance 900 component provides an advantage over competitors' products as it reduces the time taken for cybersecurity investigations, provides an alternative to manpower for small organizations, and improves detection (and remediation) capabilities within the cyber security platform.

The AI-based cyber threat analyst module performs its own computation of threats and identifies interesting network events with one or more processors. These methods of detection and identification of threats all add to the above capabilities that make the AI-based cyber threat analyst module a desirable part of the cyber security appliance 900. The AI-based cyber threat analyst module offers a method of prioritizing that is not just a summary or highest score alert of an event evaluated by itself equals the worst and prevents more complex attacks being missed because their composite parts/individual threats only produced low-level alerts.

The AI classifiers can be part of the assessment component, which scores the outputs of the analyser module. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly, but more importantly, an overall cyber threat level posed by a series/chain of correlated anomalies under analysis.

In the next step, the formatting module can generate an output such as a printed or electronic report with the relevant data. The formatting module can cooperate with both the analyser module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyser module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three.

The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat.

The formatting module can generate a threat incident report in the formalized report from a multitude of dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothetic cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyser module, then cooperates with the autonomous response module to take an autonomous action such as i) deny access in or out of the device or the network and/or ii) shutdown activities involving a detected malicious agent.

The trigger module, analyser module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Figure 11:
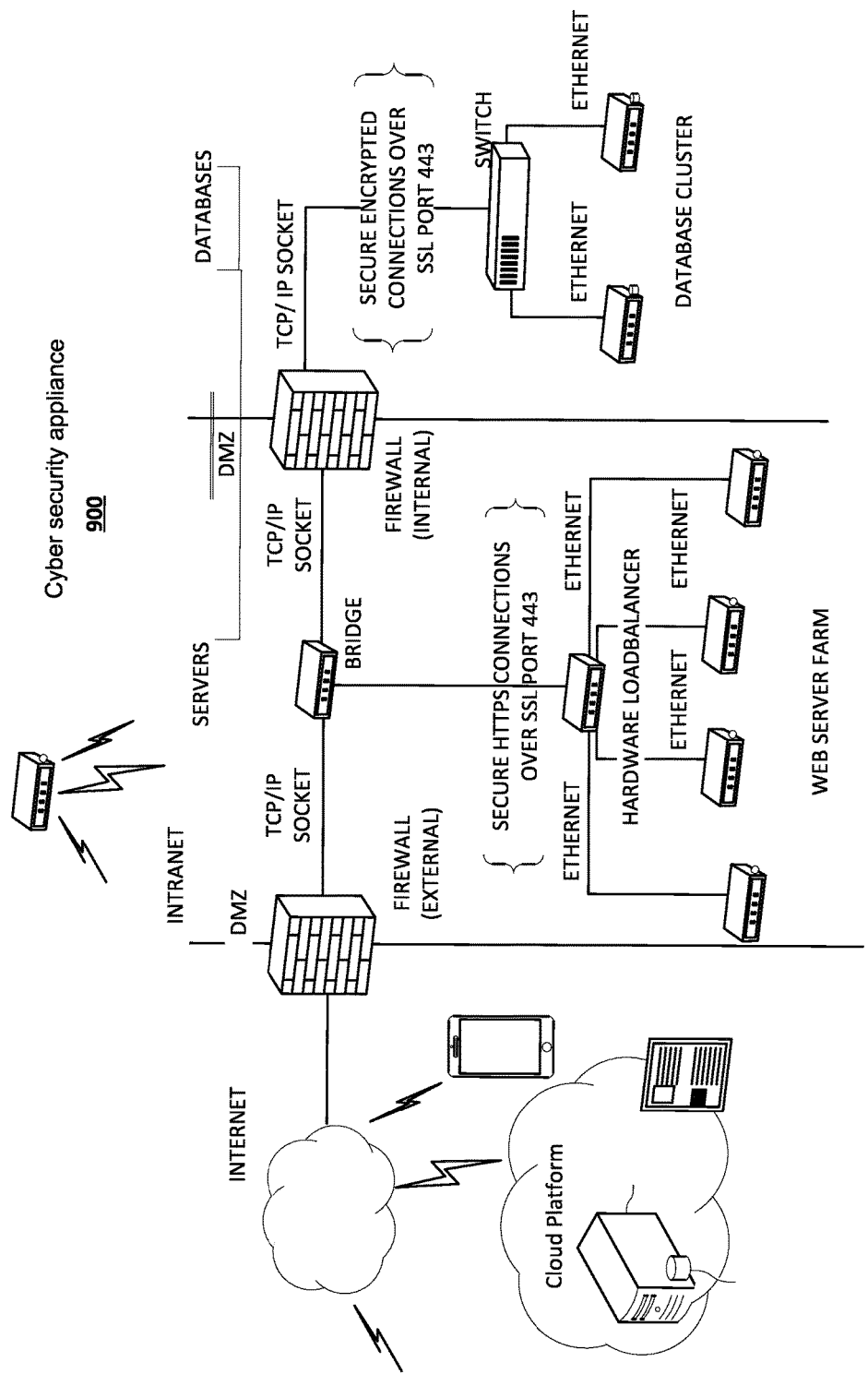
FIG. 11 illustrates a block diagram of an embodiment of the AI based cyber security appliance 900 plugging in as an appliance platform to protect a system.

FIG. 11 illustrates a block diagram of an embodiment of the AI based cyber security appliance 900 plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 900. The network can include various computing devices such as desktop units, laptop units, smartphones, firewalls, network switches, routers, servers, databases, Internet gateways, etc.

Figure 12:
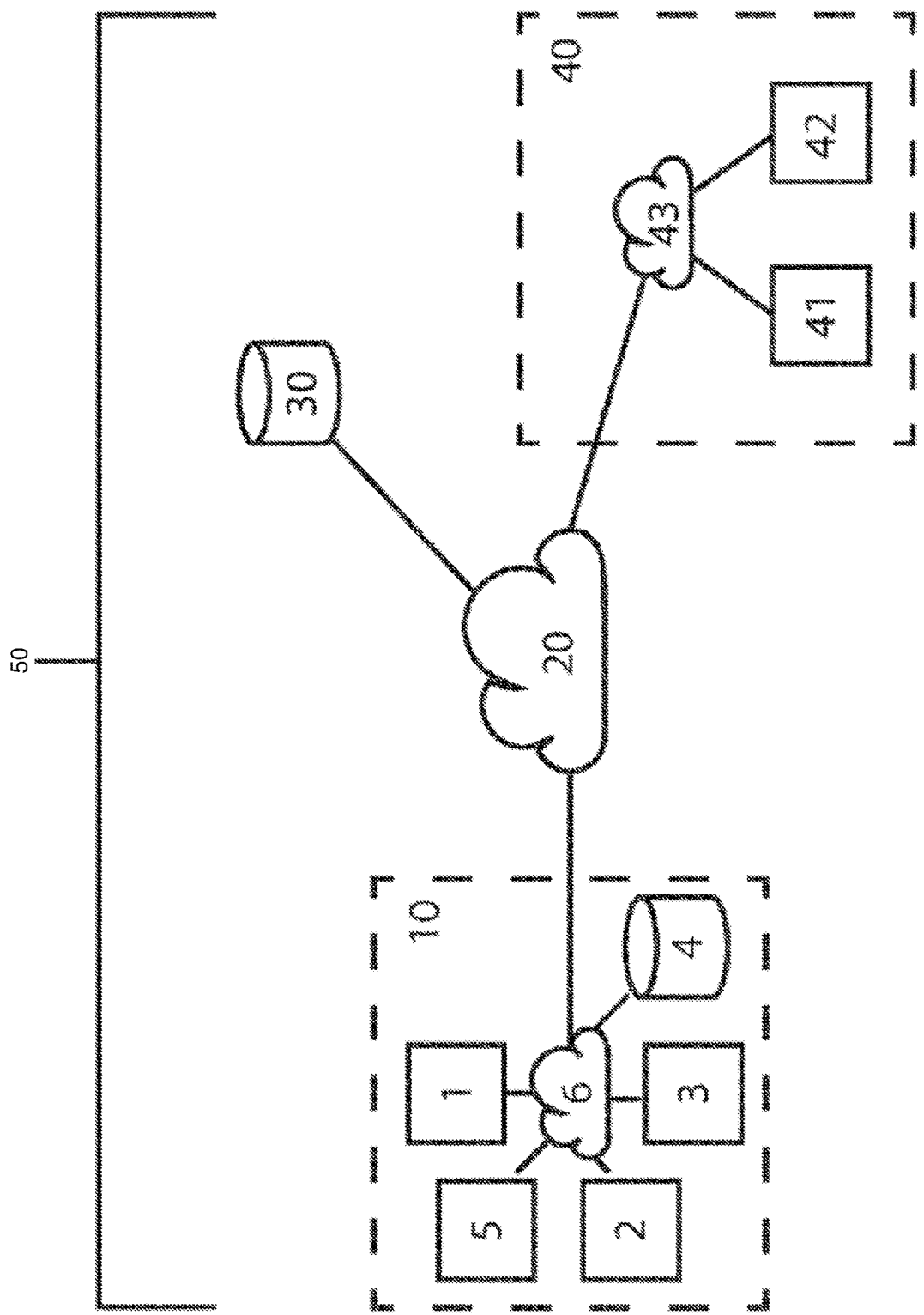
FIG. 12 illustrates an example Artificial Intelligence based cyber security system using a cyber threat analyst module to protect an example network.

FIG. 12 illustrates an example Artificial Intelligence based cyber security system using a cyber threat analyst module in the cyber security appliance 900 to protect an example network. The example network of computer systems 50 uses the cyber security appliance 900. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning, and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 900, computer 1 on the first computer system 10 has the electronic hardware, modules, models, and various software processes of the cyber security appliance 900; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 900 in computer 1 builds and maintains a dynamic, ever-changing model of the 'normal behavior' of each user and machine within the system 10. The approach is based on Bayesian mathematics, and monitors all interactions, events, and communications within the system 10—which computer is talking to which, files that have been created, and networks that are being accessed.

For example, computer 2 is based in a company's San Francisco office and operated by a marketing employee who regularly accesses the marketing network, usually communicates with machines in the company's U.K. office in second computer system 40 between 9.30 AM and midday and is active from about 8:30 AM until 6 PM.

The same employee virtually never accesses the employee timesheets, very rarely connects to the company's Atlanta network, and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 900 to spot behavior on a system that seems to fall outside of this normal pattern of life, and flags this behavior as anomalous, requiring further investigation.

The cyber security appliance 900 is built to deal with the fact that today's attackers are getting stealthier, and an attacker/malicious agent may be 'hiding' in a system to ensure that they avoid raising suspicion in an end user, such as by slowing their machine down.

The cyber security appliance 900 builds a sophisticated 'pattern of life'—that understands what represents normality for every person, device, and network activity in the system being protected by the cyber security appliance 900.

The cyber security appliance 900 can use unsupervised machine learning to work things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 900 do not always know what they are looking for but can independently classify data and detect compelling patterns.

The cyber security appliance 900's unsupervised machine learning methods do not require training data with pre-defined labels. Instead, they are able to identify key patterns and trends in the data without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 900 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information amid the noise of the network—even when it does not know what it is looking for.

The cyber security appliance 900 can use a Recursive Bayesian Estimation. To combine these multiple analyzes of different measures of network behavior to generate a single overall/comprehensive picture of the state of each device, the cyber security appliance 900 takes advantage of the power of Recursive Bayesian Estimation (RBE) via an implementation of the Bayes filter.

Using RBE, the cyber security appliance 900's AI models are able to constantly adapt themselves in a computationally efficient manner as new information becomes available to the system. The cyber security appliance 900's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case, starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events, or observations that raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, apparatus, and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-RAN or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components, including the system memory to the processing unit.

Computing Devices

Figure 13:
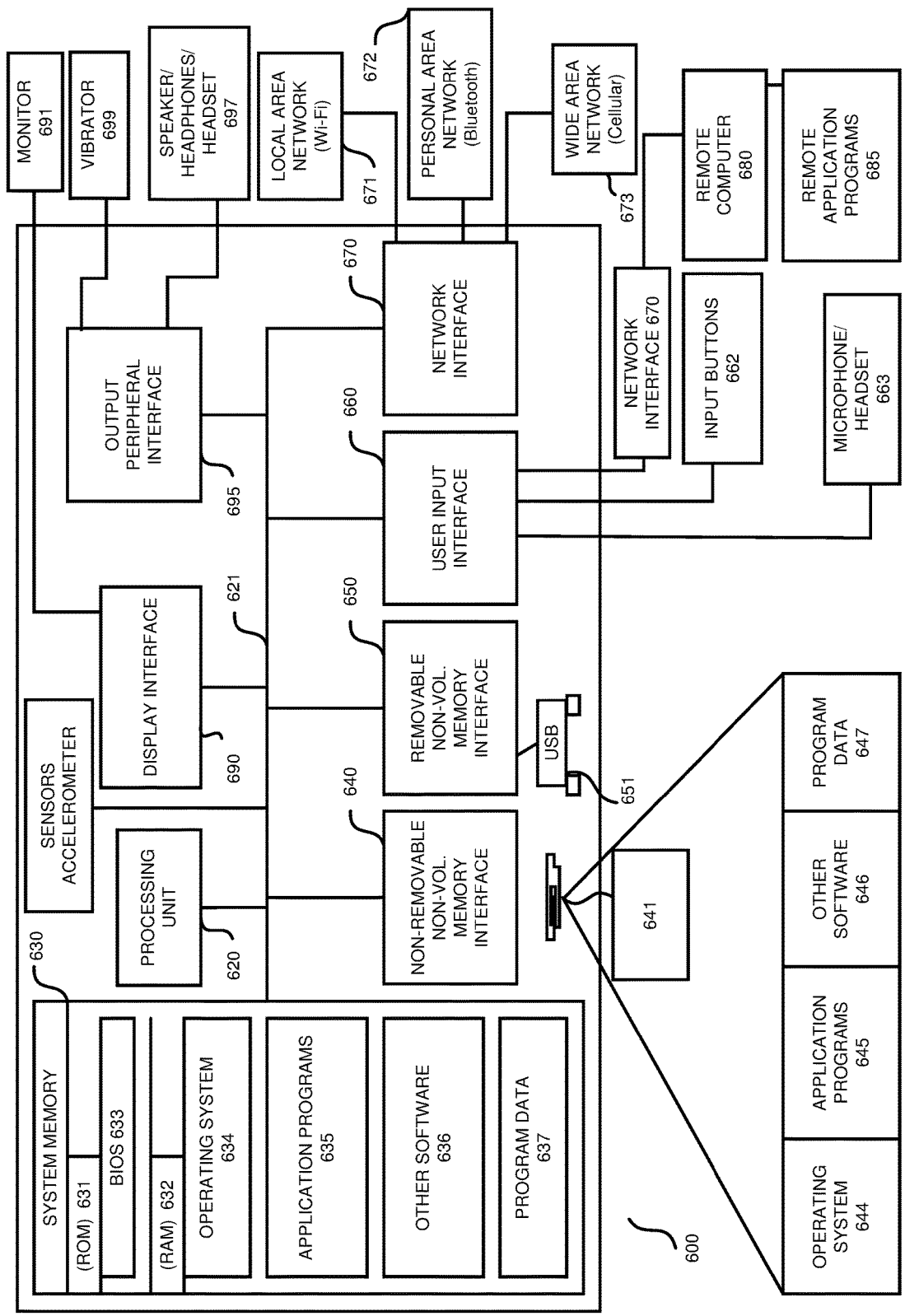
FIG. 13 illustrates a block diagram of an embodiment of one or more computing devices that can be a part of the Artificial Intelligence based cyber security system for an embodiment of the current design discussed herein.

FIG. 13 illustrates a block diagram of an embodiment of one or more computing devices that can be a part of the Artificial Intelligence based cyber security system for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device, and/or scrolling input component, such as a mouse, trackball, or touchpad 661. The microphone 663 can cooperate with speech recognition software. These and other input devices are often connected to the processing unit 620 through a user input interface 660 that is coupled to the system bus 621 but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can be a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670 or other appropriate mechanism. In a networked environment, other software depicted relative to the computing device 602, or portions thereof, may be stored in the remote memory storage device. By way of example, and not limitation, remote application programs 685 as residing on remote computing device 680. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An Artificial Intelligence based cyber security appliance, comprising:
    a cyber threat analyst module configured to investigate cyber threat attack incidents, where the cyber threat analyst module is further configured to use a data structure constructed to contain multiple tags to assist in modeling of an expansion of a plurality of disparate events subsumed into an ongoing cyber threat attack incident, during the ongoing cyber threat attack incident, to reflect a lifecycle of the ongoing cyber threat attack incident,
    where the data structure includes records of one or more graphs, nodes, edges, and tags, wherein the tags are configured to contain metadata attached to the graphs, nodes, and edges to provide information that is useful in understanding the ongoing cyber threat attack incident during its lifecycle,
    where a first tag is assigned to a first node when the first node first appears in a first graph in response to a first disparate event,
    where a second tag is assigned to a second node when the second node first appears in the first graph in response to the second disparate event,
    where the first node is coupled by a first edge to the second node forming a first group of nodes in the first graph, and where the second node and the first node are connected by the data structure in response to an indication that the cyber threat analyst module has found one or more linking points of information between the first and second disparate events,
    where the data structure is configured to maintain the second tag assigned to the second node and the first tag assigned to the first node when the data structure connects both the second node and the first node rather than eliminating or merging at least one of the first tag and the second tag after the data structure connects both,
    where a third tag is assigned to a third node when the third node first appears in the first graph in response to a third disparate event,
    where the data structure is configured to connect the third node to the first group of nodes when the cyber threat analyst module has found one or more linking points of information between the third disparate event and at least one the first and second disparate events,
    where the cyber threat analyst module has a tag assigning module configured to assign the multiple tags including the first tag, the second tag and the third tag when, respectively, the first disparate event is detected, the second disparate event is detected, and the third disparate event is detected, which allows a reporting of the disparate events as well as a visual indication of a scale of the ongoing cyber threat attack incident as they happen,
    where the cyber threat analyst module is configured to form and investigate hypotheses on what are a possible set of cyber threats based on data analysis that includes at least one of i) the abnormal behavior, ii) the suspicious activity, and iii) any combination of both, identified through cooperation with the one or more AI models trained with machine learning on the normal pattern of life of entities under the data analysis by examining at least whether a correlation exists between a series of two or more anomalies over a given frame, and
    where the cyber threat analyst module is further configured to cooperate with a formatting module to generate both i) alerts on two or more disparate events as they happen and ii) the visual indication of the scale of the ongoing cyber threat attack incident as mapped by the two or more disparate events with linked information using the data structure, which allows the reporting of the disparate events as they happen as well as a display of the visual indication of the scale of the ongoing cyber threat attack incident as mapped by the two or more disparate events with the linked information while the ongoing cyber threat attack incident is still happening, where any software instructions for the cyber threat analyst module are stored in an executable form in one or more non-transitory machine readable storage mediums to be executed by one or more processors.

2. The cyber security appliance of claim 1,
    wherein the data structure is implemented as a persistent graph-based structure.

3. The cyber security appliance of claim 1, wherein the formatting module is configured to cooperate with the data structure to generate the visual indication outputted as a graphical representation that shows a timeline of the two or more disparate events with linked information deemed by the cyber threat analyst module to be relevant to the ongoing cyber threat attack incident, and device locations of where the two or more disparate events with linked information occurred, and where the formatting module also has a user interface configured to allow a user to assemble and generate a graphical report on that ongoing cyber threat attack incident that at least graphically shows the timeline, the two or more disparate events with linking points of information, and the device locations where the two or more disparate events with linking points of information occurred, where generated visual representations of nodes in the graphical report can be interacted with to pull up additional details on that node.

4. The cyber security appliance of claim 3, wherein a first node in the graphical report is configured to be interacted with to pull up additional details on that node including i) the particular disparate event represented by that node and ii) two or more of details pertinent to the disparate event from a group consisting of i) a type of event associated with that disparate event, ii) what device was involved with that disparate event, and iii) an analysis of a relationship between the two or more disparate events with linking points of information and how they are related, where the additional details on that node will appear on the user interface in order to keep the graphical report to be presented with less details initially, and thus easier to understand, and then to supply the additional details on the nodes on a node-by-node basis in the graphical report.

5. The cyber security appliance of claim 1, wherein the cyber threat analyst module is further configured to conduct the investigation on cyber threat incidents attacking a system protected by the cyber security appliance by having at least one of i) an API to one or more additional third party cyber security protection tools and ii) a routine to gather additional information from one or more additional third party cyber security protection tools in order to evaluate a quality of at least one of 1)alerts coming from the one or more additional third party cyber security protection tools, 2) third-party data coming from the one or more additional third party cyber security protection tools, and 3) any combination of both, by correlating the alerts reported from the one or more additional third party cyber security protection tools to a results of the investigation on the cyber threat incidents attacking the system conducted by the cyber threat analyst module, where the cyber threat analyst module is configured to cooperate with the formatting module to generate a validity understanding of a fidelity of alerts that were fed to the cyber threat analyst module from third-party tools by correlating whether those alerts were actually part of a particular cyber threat attack incident, or whether those alerts were not part of any cyber threat attack incident; and thus, deemed a false positive.

6. The cyber security appliance of claim 1,
where in the first tag corresponds to a first initial event identifier tag and the second tag corresponds to a second initial event identifier tag,
wherein the data structure to contain the multiple tags is configured to allow the cyber threat analyst module to utilize the multiple tags as the cyber threat analyst module accumulates information about a particular event occurring in an ongoing cyber threat attack incident, and then assign a first group tag to the first and second disparate events with linking points of information as the linking points are found to be likely between the first disparate event and the second disparate event to tie these events as likely related while still retaining initial information contained in both the first initial event identifier tag assigned to the first disparate event and the second initial event identifier tag assigned to the second disparate event, and where the cyber threat analyst module is configured to use the retained initial information contained in at least one of the first initial event identifier tags assigned to the first disparate event and the second initial event identifier tag assigned to the second disparate event to link pieces of information contained in at least one of the first initial event identifier tag and the second initial event identifier tag with the third disparate event when the third disparate event has not yet been confirmed as being related to the first group tag assigned to the first disparate event and the second disparate; and thus, the multiple tags preserve original information captured in the initial event identifier tag so that the cyber threat analyst module still can go back and piece information together via use of the information in the multiple tags.

7. The cyber security appliance of claim 1, further comprising:
where the data structure is configured to connect two or more nodes determined to be related by the cyber threat analyst module via one or more mechanisms consisting of 1) by adding a group tag that indicates that the nodes are related, and 2) by performing a calculation of relatedness and using at least one of a software pointer and other tracking mechanism that indicates that the nodes are related.

8. The cyber security appliance of claim 1, where the formatting module is configured to 1) apply a plurality of different colors to convey commonality and differences between a plurality of generated visual representations in a graphical report corresponding to the two or more disparate events with linking points of information to assist in an understanding of the graphical report as well as 2) present the visual representations positionally within a network in relation to other devices involved in the cyber threat attack and/or geographically in relation to other devices involved in the cyber threat attack.

9. The cyber security appliance of claim 1, wherein the cyber threat analyst module is configured to investigate the cyber threat attack incidents by cooperation with one or more of the group consisting of:
one or more artificial intelligence models trained on how human cyber security analysts conduct an investigation on a possible set of cyber threats hypotheses,
one or more scripts outlining how to conduct an investigation on a possible set of cyber threats hypotheses, and
one or more rules-based models on how to conduct an investigation on a possible set of cyber threats hypotheses.

10. A method for an Artificial Intelligence based cyber security appliance, comprising:
using a cyber threat analyst module to investigate cyber threat attack incidents, where the cyber threat analyst module is further configured to use a data structure constructed to contain multiple tags to assist in modeling of an expansion of a plurality of disparate events subsumed into an ongoing cyber threat attack incident, during the ongoing cyber threat attack incident, to reflect a lifecycle of the ongoing cyber threat attack incident,
where the data structure includes records of graphs, nodes, edges, and tags, wherein the tags contain metadata attached to the graphs, nodes, and edges to provide information that is useful in understanding the ongoing cyber threat attack incident during its lifecycle,
assigning a first tag to a first node when the first node first appears in a first graph in response to a first disparate event, assigning a second tag to a second node when the second node first appears in the first graph in response to the second disparate event, forming a first group of nodes in the first graph where the first node is coupled by a first edge to the second node, and where the second node and the first node are connected by the data structure in response to an indication that the cyber threat analyst module has found one or more linking points of information between the first and second disparate events, using the data structure to maintain the second tag assigned to the second node and the first tag assigned to the first node when the data structure connects both the second node and the first node rather than eliminating or merging at least one of the first tag and the second tag after the data structure connects both, assigning a third tag to a third node when the third node first appears in the first graph in response to a third disparate event, using the data structure to connect the third node to the first group of nodes when the cyber threat analyst module has found one or more linking points of information between the third disparate event and at least one the first and second disparate events, using a tag assigning module to assign the multiple tags including the first tag, the second tag and the third tag when, respectively, the first disparate event is detected, the second disparate event is detected, and the third disparate event is detected, which allows a reporting of the disparate events as well as a visual indication of a scale of the ongoing cyber threat attack incident as they happen, using the cyber threat analyst module to form and investigate hypotheses on what are a possible set of cyber threats in light of based on data analysis that includes at least one of i) the abnormal behavior, ii) the suspicious activity, and iii) any combination of both, identified through cooperation with the one or more AI models trained with machine learning on the normal pattern of life of entities under analysis by examining at least whether a correlation exists between a series of two or more over a given timeframe, and using the cyber threat analyst module to cooperate with a formatting module to generate both i) alerts on two or more disparate events as they happen and ii) the visual indication of the scale of the ongoing cyber threat attack incident as mapped by the two or more disparate events with linked information using the data structure, which allows the reporting of the disparate events as they happen as well as a display of the visual indication of the scale of the ongoing cyber threat attack incident as mapped by the two or more disparate events with the linked information while the ongoing cyber threat attack incident is still happening.

11. The method for the cyber security appliance of claim 10, further comprising:

configuring the data structure to be implemented as a persistent graph-based structure.

12. The method for the cyber security appliance of claim 10, further comprising:

configuring the formatting module to cooperate with the data structure to generate the visual indication outputted as a graphical representation that shows a timeline of the two or more disparate events with linked information deemed by the cyber threat analyst module to be relevant to the ongoing cyber threat attack incident, and device locations of where the two or more disparate events with linked information occurred, and configuring the formatting module to have a user interface to allow a user to assemble and generate a graphical report on that ongoing cyber threat attack incident that at least graphically shows the timeline, the two or more disparate events with linking points of information, and the device locations where the two or more disparate events with linking points of information occurred, where generated visual representations of nodes in the graphical report can be interacted with to pull up additional details on that node.

13. The method for the cyber security appliance of claim 12, further comprising:

configuring a first node in the graphical report to be interacted with to pull up the additional details on that node including i) the particular disparate event represented by that node and ii) two or more of details pertinent to the disparate event from a group consisting of i) a type of event associated with that disparate event, ii) what device was involved with that disparate event, and iii) an analysis of a relationship between the two or more disparate events with linking points of information and how they are related, where the additional details on that node will appear on the user interface in order to keep the graphical report to be presented with less details initially, and thus easier to understand, and then to supply the additional details on the nodes on a node-by-node basis in the graphical report.

14. The method for the cyber security appliance of claim 10, further comprising:

configuring the cyber threat analyst module to conduct the investigation on cyber threat incidents attacking a system protected by the cyber security appliance by having at least one of i) an API to one or more additional third party cyber security protection tools and ii) a routine to gather additional information from one or more additional third party cyber security protection tools in order to evaluate a quality of at least one of 1) alerts coming from the one or more additional third party cyber security protection tools, 2) third-party data coming from the one or more additional third party cyber security protection tools, and 3) any combination of both, by correlating the alerts reported from the one or more additional third party cyber security protection tools to results of the investigation on the cyber threat incidents attacking the system conducted by the cyber threat analyst module, and configuring the cyber threat analyst module to cooperate with the formatting module to generate a validity understanding of a fidelity of alerts that were fed to the cyber threat analyst module from third-party tools by correlating whether those alerts were actually part of a particular cyber threat attack incident, or whether those alerts were not part of any cyber threat attack incident; and thus, deemed a false positive.

15. The method for the cyber security appliance of claim 10, further comprising:

where in the first tag corresponds to a first initial event identifier tag and the second tag corresponds to a second initial event identifier tag, configuring the data structure to contain the multiple tags to allow the cyber threat analyst module to utilize the multiple tags as the cyber threat analyst module accumulates information about a particular event occurring in an ongoing cyber threat attack incident, and then assign a first group tag to the first and second disparate events with linking points of information as the linking points are found to be likely between the first disparate event and the second disparate event to tie these events as likely related while still retaining initial information contained in both the first initial event identifier tag assigned to the first disparate event and the second initial event identifier tag assigned to the second disparate event, and configuring the cyber threat analyst module to use the retained initial information contained in at least one of the first initial event identifier tag assigned to the first disparate event and the second initial event identifier tag assigned to the second disparate event to link pieces of information contained in at least one of the first initial event identifier tag and the second initial event identifier tag with a third disparate event when the third disparate event has not yet been confirmed as being related to the first group tag assigned to the first disparate event and the second disparate event, wherein the multiple tags preserve original information captured in the initial event identifier tag so that the cyber threat analyst module still can go back and piece information together via a use of the information in the multiple tags.

16. The method for the cyber security appliance of claim 10, further comprising:

configuring the data structure to connect two or more nodes determined to be related by the cyber threat analyst module via one or more mechanisms consisting of 1) by adding a group tag that indicates that the nodes are related, and 2) by performing a calculation of relatedness and using at least one of a software pointer and other tracking mechanism that indicates that the nodes are related.

17. The method for the cyber security appliance of claim 10, further comprising:

configuring the formatting module to 1) apply a plurality of different colors to convey commonality and differences of between a plurality of generated visual representations in a graphical report corresponding to the two or more disparate events with linking points of information to assist in an understanding of the graphical report as well as 2) present the visual representations positionally within a network in relation to other devices involved in the cyber threat attack and/or geographically in relation to other devices involved in the cyber threat attack.

18. The method for the cyber security appliance of claim 10, further comprising:

configuring the cyber threat analyst module to investigate the cyber threat incidents by cooperation with one or more of the group consisting of:

one or more artificial intelligence models trained on how human cyber security analysts conduct an investigation on a possible set of cyber threats hypotheses, one or more scripts outlining how to conduct an investigation on a possible set of cyber threats hypotheses, and one or more rules-based models on how to conduct an investigation on a possible set of cyber threats hypotheses.

19. A non-transitory machine readable storage medium configured to store instructions and data to be executed by one or more processors, where the instructions, when executed, cause a cyber security appliance to perform steps as follows, comprising:

causing a cyber threat analyst module to investigate cyber threat incidents, causing the cyber threat analyst module to use a data structure constructed to contain multiple tags to assist in modeling of an expansion of an amount of disparate events subsumed into an ongoing cyber threat attack incident, during the ongoing cyber threat attack incident, to reflect a lifecycle of the ongoing cyber threat attack incident, assigning a first tag to a first node when the first node first appears in a first graph in response to a first disparate event, assigning a second tag to a second node when the second node first appears in the first graph in response to the second disparate event, forming a first group of nodes in the first graph where the first node is coupled by a first edge to the second node, and where the second node and the first node are connected by the data structure in response to an indication that the cyber threat analyst module has found one or more linking points of information between the first and second disparate events, using the data structure to maintain the second tag assigned to the second node and the first tag assigned to the first node when the data structure connects both the second node and the first node rather than eliminating or merging at least one of the first tag and the second tag after the data structure connects both, assigning a third tag to a third node when the third node first appears in the first graph in response to a third disparate event, using the data structure to connect the third node to the first group of nodes when the cyber threat analyst module has found one or more linking points of information between the third disparate event and at least one the first and second disparate events, using a tag assigning module to assign the multiple tags including the first tag, the second tag and the third tag when, respectively, the first disparate event is detected, the second disparate event is detected, and the third disparate event is detected, which allows a reporting of the disparate events as well as a visual indication of a scale of the ongoing cyber threat attack incident as they happen, using the cyber threat analyst module to form and investigate hypotheses on what are a possible set of cyber threats based on analysis that includes at least one of i) the abnormal behavior, ii) the suspicious activity, and iii) any combination of both, identified through cooperation with the one or more AI models trained with machine learning on the normal pattern of life of entities under analysis by examining at least whether a correlation exists between a series of two or more anomalies over a given timeframe, and causing the cyber threat analyst module to cooperate with a formatting module to generate both i) alerts on the disparate events as they happen and ii) the visual indication of the scale of the ongoing cyber threat attack incident as mapped by the disparate events with linked information while the ongoing cyber threat attack incident is still happening.

20. The machine readable medium of claim 19, further configured to store further instructions and data to be executed by the one or more processors, where the further instructions, when executed, cause the cyber security appliance to perform steps as follows, comprising:

causing the data structure to be implemented as a persistent graph-based structure.

* * * * *